(12) United States Patent
Tobey et al.

(10) Patent No.: US 6,714,894 B1
(45) Date of Patent: Mar. 30, 2004

(54) SYSTEM AND METHOD FOR COLLECTING, PROCESSING, AND DISTRIBUTING INFORMATION TO PROMOTE SAFE DRIVING

(75) Inventors: Peter W. Tobey, Malvern, PA (US); Marc Merritt, Collegeville, PA (US)

(73) Assignee: Merritt Applications, Inc.

( * ) Notice: Subject to any disclaimer, the term of this patent is extended or adjusted under 35 U.S.C. 154(b) by 0 days.

(21) Appl. No.: 09/951,654

(22) Filed: Sep. 13, 2001

Related U.S. Application Data
(60) Provisional application No. 60/302,083, filed on Jun. 29, 2001.

(51) Int. Cl.$^7$ ................................................. G06F 9/00
(52) U.S. Cl. ...................... 702/188; 702/182; 702/183; 702/190
(58) Field of Search .................... 434/62, 65; 340/438, 340/439; 702/109, 120, 177, 179, 182, 183, 188, 190

(56) References Cited

U.S. PATENT DOCUMENTS

| | | | |
|---|---|---|---|
| 5,835,008 A | * 11/1998 | Colemere, Jr. | ............... 340/439 |
| 6,064,970 A | * 5/2000 | McMillan et al. | ............... 705/4 |
| 6,253,129 B1 | * 6/2001 | Jenkins et al. | ................ 701/29 |
| 2001/0039002 A1 | * 11/2001 | Delehanty | .................... 434/322 |

* cited by examiner

*Primary Examiner*—Marc S. Hoff
*Assistant Examiner*—Felix Suarez
(74) *Attorney, Agent, or Firm*—Woodcock Washburn LLP

(57) ABSTRACT

A system and methods that allow for the collection, processing, and distribution of information to promote driver safety. In an illustrative implementation, a computing application is provided that accepts driver/vehicle accident or incident information, standardizes the driver/vehicle information, identifies critical events, assigns adaptable risk levels to the driver/vehicle information, and processes the driver/vehicle information to recommend customized remediation to the drivers in an effort to reduce risk levels and promote safer driving. The computing application also generates reports indicative of driver/vehicle behavior, remediation progress risk levels, critical events and information relating to the use of the exemplary computing application. The exemplary computing application is preferably Web-enabled to allow remote access by drivers and administrators.

32 Claims, 33 Drawing Sheets

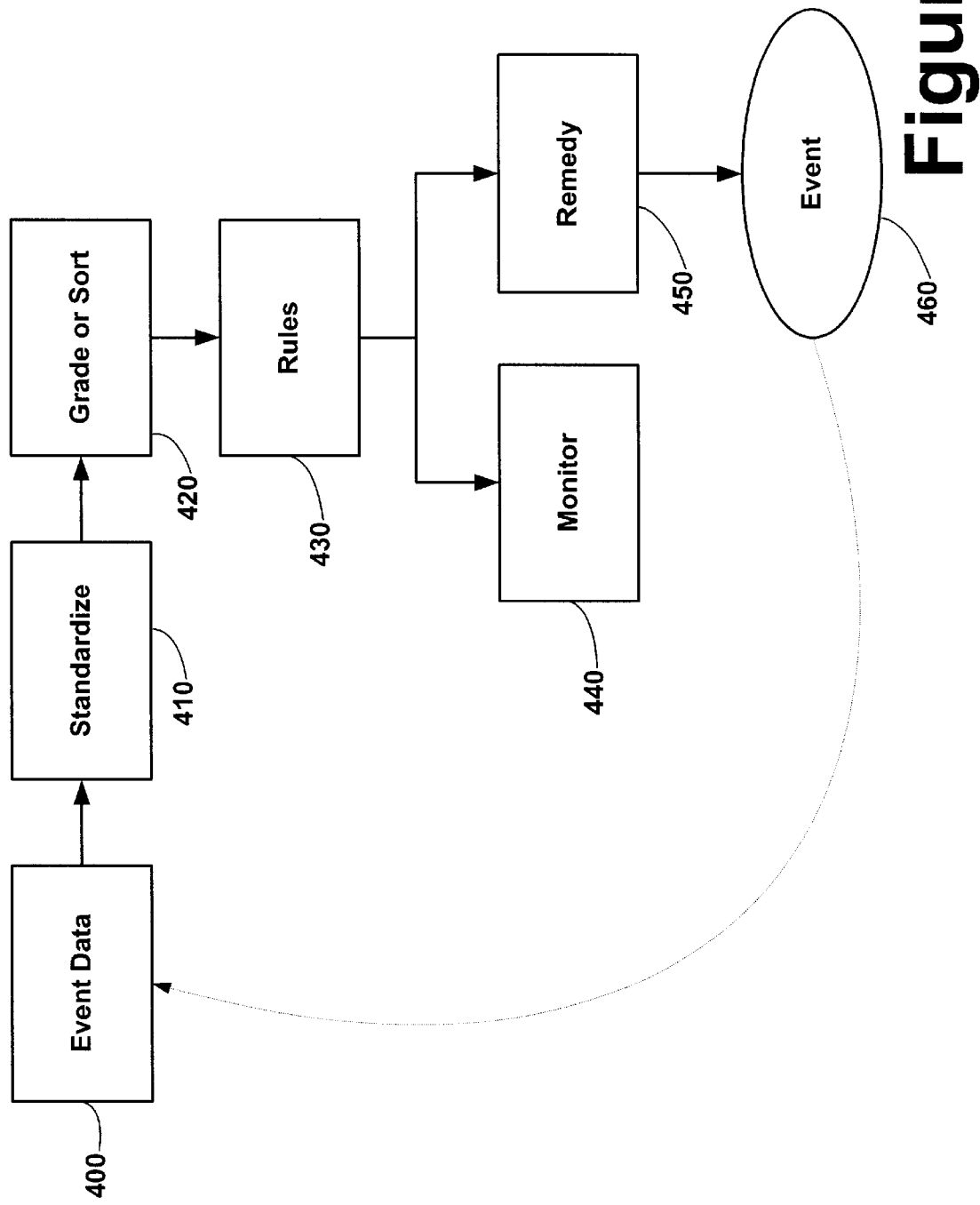

515  510

SYSTEM AND METHOD FOR COLLECTING, PROCESSING, AND DISTRIBUTING INFORMATION TO PROMOTE SAFE DRIVING

PRIORITY

This application is related to and claims priority under 35 U.S.C. §119(e) to U.S. Provisional Patent Application Serial No. 60/302,083, filed Jun. 29, 2001, entitled "SYSTEM AND METHODS FOR COLLECTING, PROCESSING, AND DISTRIBUTING INFORMATION TO PROMOTE SAFE DRIVING", the contents of which are hereby incorporated by reference in their entirety.

FIELD OF THE INVENTION

The present invention relates to the field of driver safety and, more particularly, to automation of driver monitoring to facilitate the process of aggregating, processing, and displaying driver safety information in an effort to promote safe driving.

BACKGROUND

Vehicle accidents and/or incidents (e.g. traffic violations, property damage, or injury) can be rather expensive as there are many costs that can be incurred as a result of an accident or incident. Direct costs include medical care, legal expenses, property damage and lost productivity. In addition, there may be costs associated with pain and suffering of injured parties. Such costs can be difficult to forecast and calculate.

Collected data supports the proposition that vehicular accidents and incidents are costly. For example, in 1994 over 325,000 workers and their dependents in the United States were injured in on-the-job automobile crashes. Comparatively, nearly 5,000,000 were injured in off-the-job crashes. Recent studies have found that the cost to an employer of an on-the-job automobile crash is $25,000, while off-the-job accidents can cost an employer $20,000. As a result, companies spend over $100 billion a year on crash-related medical care. An additional $9 billion goes to sick leave and insurance.

These costs can be broken down categorically. For example, there may be health fringe benefit costs associated with vehicle accidents and/or incidents. These are the costs paid by employers because of illness or injury. Generally, medical insurance, social security and private disability insurance, dependent coverage, sick leave, physical rehabilitation, life and survivor insurance all fall into this category of costs. There may also be non-fringe costs including motor vehicle property damage and liability insurance. Other property losses include vehicle contents and third party losses. In addition, legal expenses, car rental costs, police, fire and ambulance services all contribute to non-fringe costs. Furthermore, vehicle accidents and/or incidents can contribute to lost productivity by injured employees and co-workers. There are also costs associated with hiring replacement personnel and training costs for training replacement personnel.

In certain circumstances, employers pay workers extra for risky jobs. While this cost may seem negligible in some areas, it is real. Because many people avoid jobs with significant driving involved, the cost of hiring those who will drive rises. As such, there exists a real wage premium for the risk associated with driving. This cost is born when attending to vehicle accidents and/or incidents. There are also administrative costs that arise from vehicular accidents and/or incidents. For example, there are costs in administrating and processing paperwork, phone calls, reimbursement and repair programs, and documentation for accidents and/or incidents. In dollars, the National Highway Traffic Safety Administration estimates that each fatal accident results in $55,000 in administrative costs to employers.

Further, accidents and/or incidents can result in a need for substitute labor, time wasted in rescheduling, and the need for additional supervisory efforts. Statistics show that the disruption due to the loss of an employee as a result of a deadly crash can be as much as $510,000 per death. Also, it has been shown that lost productivity from automobile crashes costs the US economy $42 billion a year.

Moreover, there are significant opportunity costs that arise from a vehicular accident and/or incident. Simply stated, opportunity costs are costs that are attributed to a decision resulting in less profit than had an alternative more-profitable decision been made. For example, driving a car such that you crash it is a choice. The negative ramifications of the crash include opportunity costs. For instance, drivers lose time due to injury. In addition, drivers also lose time to fill out forms, manage repairs, rent alternative transportation, etc.

The overall cost to society of automobile crashes can be astronomical. For example, in 1999 the total cost of crashes and injuries in the US was $175 billion. These costs are leveraged to society at large and not just to the causes of crashes. For instance, society is charged with paying for the police force required to attend to vehicle accidents and/or incidents, the costs of supporting emergency response, costs associated with keeping our courts in order to adjudicate over vehicular accidents and/or incidents, as well as costs to support state-supported health care. In addition, the lost taxes on lost wages are significant. Most important, however is the fact that the insurance costs (either direct or indirect) of crashes are borne by society at large. Insurance spreads these costs very effectively so that everyone who drives pays almost equally for everyone who crashes.

In response to the significant costs resulting from accidents and/or incidents, a number of preventive measures have been developed. Among these preventive measures are driver safety programs that educate drivers to engage in safe driving, thereby reducing the amount of accidents and/or incidents. However, the cost effectiveness of these safety programs is open to much debate.

Traditional driver safety programs can offer various degrees of complexity from parents teaching their child how to drive on a neighborhood street, to more formalized programs in which a pre-defined curriculum for driving safety is taught to drivers. A commonality amongst these programs is that they are proactive. That is, education is leveraged to those drivers that are suspected to be in need of driving safety education (e.g. traffic school). Such programs prescribe cautions that are generally wise and teach generalized techniques. As a result, however, the content tends to be irrelevant to the lectures' particular driving rehabilitation needs. That is, a driver may have a hard time stopping at stop signs and may be required by a governing administrative authority (e.g. department of transportation) to attend a class on driving safety. However, the driving safety class is generalized so that it addresses stopping at stop signs very briefly so as to cover a wide range of driving issues. As a result, the driver attending such a class receives little benefit from the education provided.

Anecdotal data supports the poor efficacy of current driver safety programs. For example, even with driver education, there seems to be a tremendous amount of vehicular accidents and incidents. It is no secret that driving has become a preferred activity for commuters. However, even with the amount of driving that occurs, it has been determined that most accidents do not result in serious injury or in fatalities. In the same breath, there are accidents that do produce serious injury and fatalities. So much so that around 42,000 people died in 1999 as a result of vehicular accidents. Simply stated, with the amount of driving that occurs, even proportionately rare events occur on some frequent basis. The goal of current driver safety programs has been to reduce the amount of accidents by proactively educating drivers. However, current practices are ineffective as they do not predict and rehabilitate drivers' accident trends.

Current driving safety programs will typically contain a driver education portion and driver monitoring portion. The driver education is leveraged to drivers through publications, seminars, and behind the wheel training. Comparatively, driver monitoring may be realized through manual analysis of driver accident and/or incident information. As is imagined, manual analysis is a time intensive and laborious practice that demands significant care and attention. Currently, with the best driver education and best monitoring, today's driver safety programs fall short of significantly improving and promoting driver safety for a number of reasons. First, the training is not targeted to individual driver needs. Driver failures are not uniformly measured and corrected. Further, driver education is deemed inappropriate and unimportant by the participants. Also, the training that is provided is not consistently applied to all drivers. When driver education is received, the education is undocumented and there is rarely follow up driver education. From an administrative stand-point, driver education is cumbersome and requires significant resources. Also, from a cost perspective, effective driver education and monitoring can be rather expensive. Current practices are further ineffective because driver safety data is slowly gathered and analyzed resulting in time lags between the accident and/or incident and driver rehabilitation.

From a driving safety educational material context, conventional driver safety programs involve newsletters, pamphlets, manuals, and all sorts of printed material. The subject matter of these publications typically instruct drivers about speeding, alcohol, aggression, seat belts, braking, cell phones, buffer zones, defensive driving, foul weather, intersections, highway driving, night driving, pedestrians, and haste. These are only a few of the key subjects that are covered. Although these publishing efforts help, they are almost never delivered to the correct audience at the needed time. When the appropriate message reaches its intended audience, other distracting messages usually surround the intended message.

Moreover, with current life pace, drivers have little time, if any, to attend to reviewing and, more importantly, retaining these intended messages. For example, ensuring that safety educational materials is read by a salesman that has an unmet quota is a difficult task, unless the intended audience is personally supervised. The costs and inconvenience of such supervision is much too high for current business environments. Specifically, the supervisor is left to make judgments about drivers, administer education and track performance. The administration of such tasks is increasingly impractical. As a result, what may be considered valuable driving safety information is put to the wayside and the driver is often left to continue driving until a more serious event occurs (e.g. a fatal accident).

The same shortcomings are realized by driver safety messages delivered via audiotape, CD ROMs, and videos. Driver safety information, whether taught by a concerned parent or emailed to an entire sales force, is generally ignored because it is not customized and/or tailored for the intended audience. Further, the audience generally considers such information inappropriate to them.

More advanced training programs involve behind-the-wheel training. Behind-the-wheel training offers the advantage of demanding the full attention of the student for some part of the teaching experience. Whether one-on-one or in small groups, being taught to drive cars by actually driving them assists in drivers focusing on safety and can significantly assist in the learning process. However, these training programs also suffer shortcomings. First, they are usually proactive and as such they do not address specific driver needs. Secondly, they tend to be treated as a recreational activity resulting in a less than serious attitude thereby affecting the learning process. Lastly, they are relatively expensive and as such are not offered extensively.

Comparatively, there are driving safety programs that are reactive in nature. Reactive systems promise to deliver appropriate driver safety training to individuals by analyzing their behavior and responding to it. Thus, monitoring drivers individually is essential to avoiding the problems of proactive driver safety education. Monitoring drivers manually (or with simple computer aids like spreadsheets) is inadequate, however, especially when monitored populations are large. Current manual and computer assisted monitoring systems include a variety of sorting and analytical methods. These methods range from manually ferreting out driver records from piles and piles of paper to cursory trend analysis on simple computer spreadsheets. These methods are also inaccurate as they require averaging, generalization, and do not allow for fine distinction analysis. Moreover, current reactive practices do not lend themselves to quick response times rendering them ineffective in quickly rehabilitating offending drivers.

Specifically, current driver training systems and methods cannot accurately analyze or quickly update the complex data that is involved. Current drawbacks include input delays, input errors, manual and/or semi-manual analysis of driver data, vague classifications, simplistic sorting and judgment errors. As a result, inconsistency abounds. Also, record keeping is spotty at best with current systems and methods. Generally, data that flows from governmental jurisdictions to accident-reporting agencies, leasing companies and insurance companies are slowly absorbed and converted for use. Further, since driver event data is not standardized from one state to the next, raw driver event data generally has disparate formats, rendering analysis a difficult task at best. Because of such drawbacks and shortcomings, responses to driver offenses (e.g. remediation) are often too late to be useful.

From the foregoing, it is appreciated that there exists a need for systems and methods to overcome limitations of prior art driver safety programs. By having systems and methods that automatically collect and analyze driver behavior and leverage driving safety information, driving safety may be better promoted and realized. Such is the goal of the present invention.

SUMMARY OF THE INVENTION

The present invention provides systems and methods that automate driver behavior analysis and driving safety information delivery. In an illustrative implementation, the present invention comprises a computing application operating in a computing environment. In operation, the illustrative computing application accepts and/or collects records of driver performance and analyzes the risk levels and weaknesses of drivers based on those records. Upon a change in risk level for a particular driver and/or group of drivers, the computing application communicates remediation materials and other responses to drivers. In a reporting capacity, the present invention is capable of communicating information about monitored drivers to participating drivers and administrators. For example, information relating to drivers' behavior, drivers' risk levels, critical events, remediation activities, and system use may be communicated.

The exemplary computing application embodying a preferred embodiment of the present invention may comprise a Web-based computing application having specific areas dedicated for content and interface features offered to drivers and specific areas dedicated for content and interface features offered to administrators of drivers (e.g. a fleet manager). Within the drivers' dedicated areas participating drivers are offered, in real-time, content relating to that driver's event history, risk level, and educational needs. The present invention may exploit various communication means to communicate such information and is capable of tracking driver interaction with the computing application.

Simultaneous with the above, the present invention offers analytical features that perform analysis and generate reports on driver information. That is, among other things, the present invention is capable of monitoring changes in driver performance and educational activity and testing by and of drivers. Further, the present invention is capable of providing detailed summarized reports of various driver information, as well as, storage of all monitored events, evidence of communications between the computing system and drivers, drivers actions, and correspondence. This information may be accessed and manipulated as desired by an administrator (e.g. fleet manager), for example.

DETAILED DESCRIPTION OF THE DRAWINGS

The systems and methods allowing for the collection, processing, and distribution of information to promote safe driving are further described with reference to the accompanying drawings in which:

FIG. 4 is a block diagram showing the data and processing flow among components of the present invention;

Figure 5:
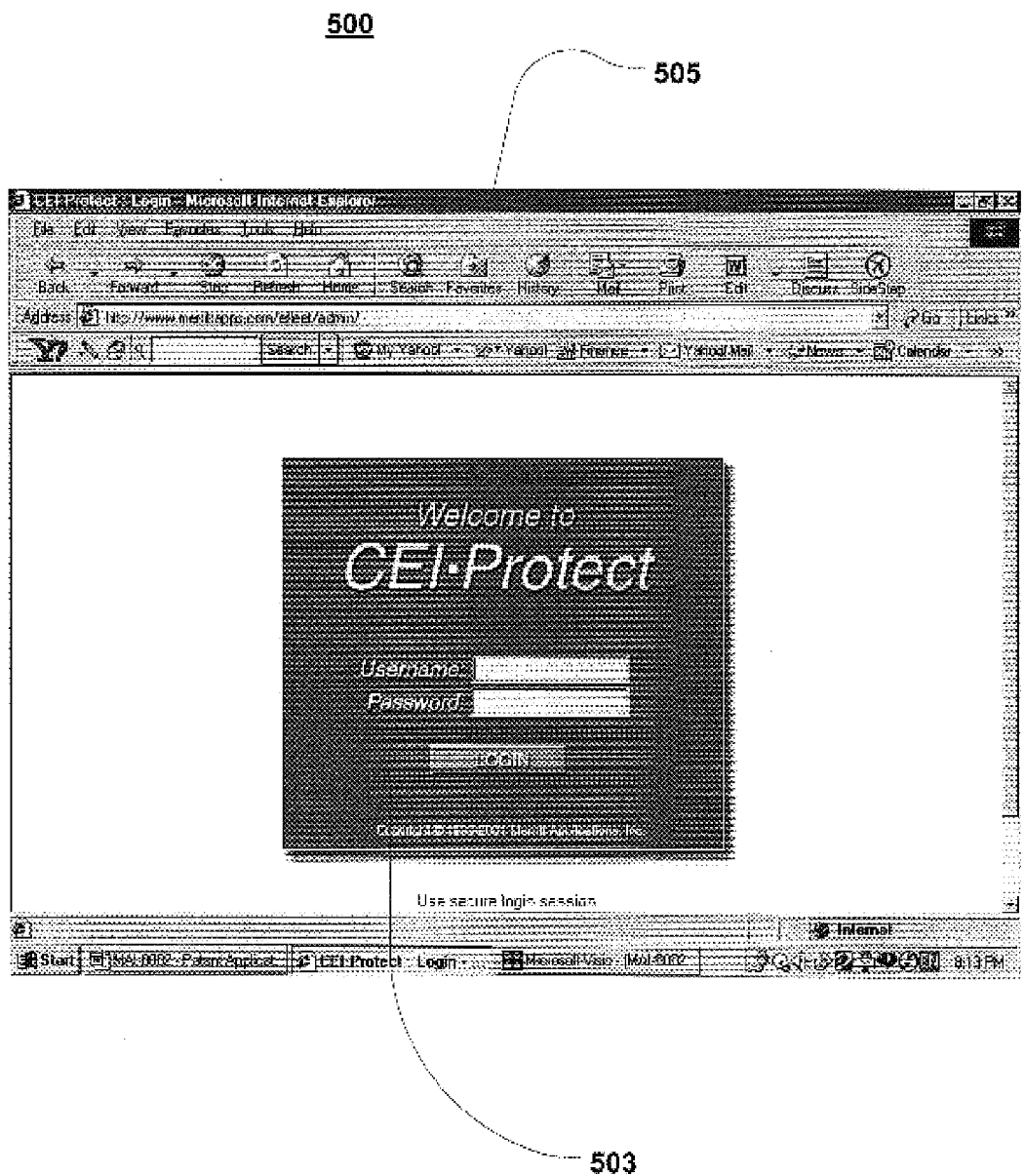
Figure 5A:
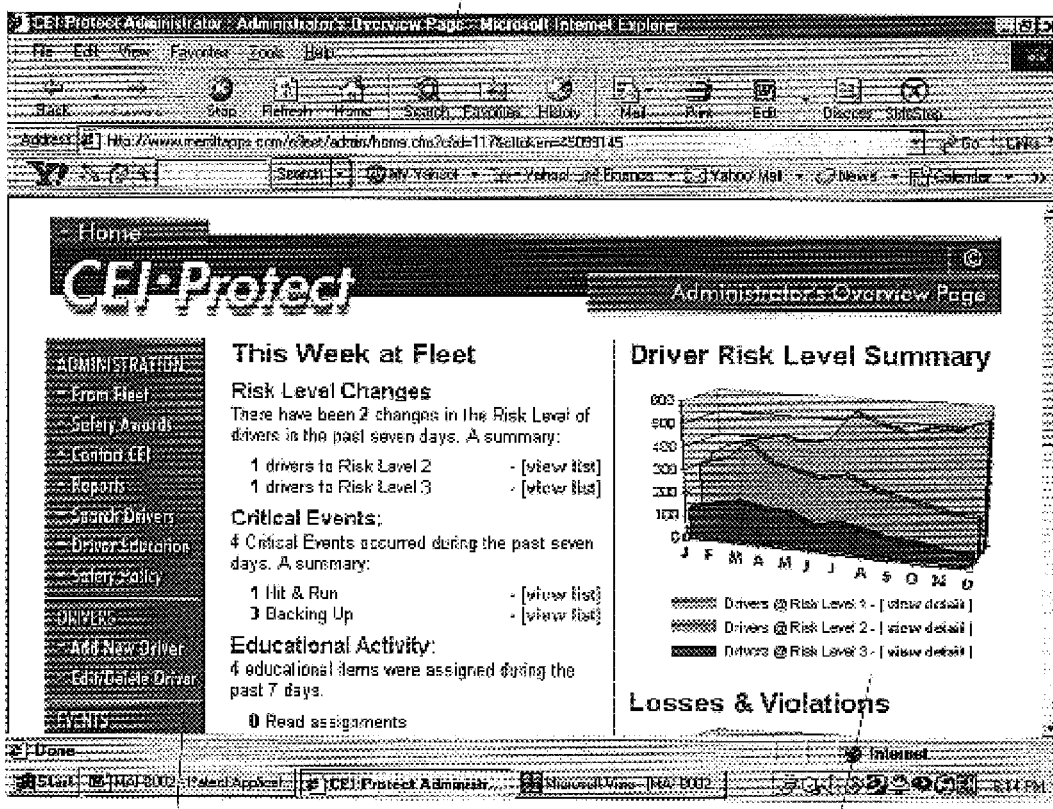
Figure 5B:
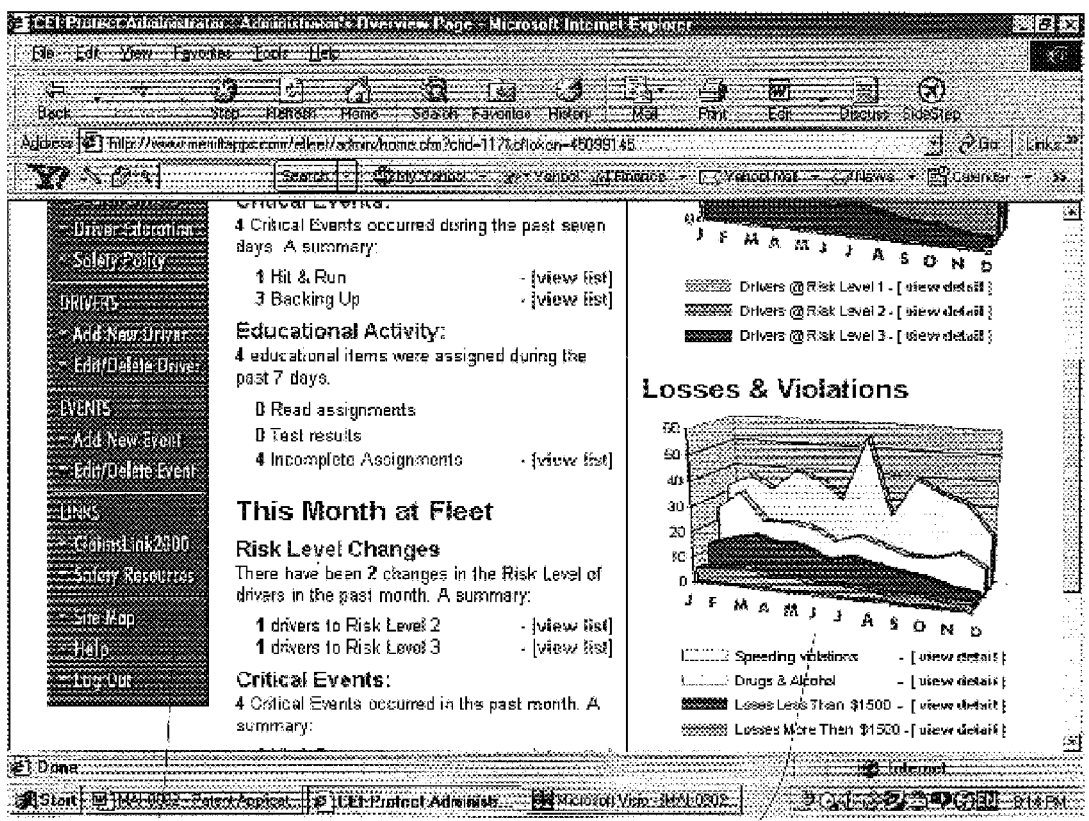
Figure 6:
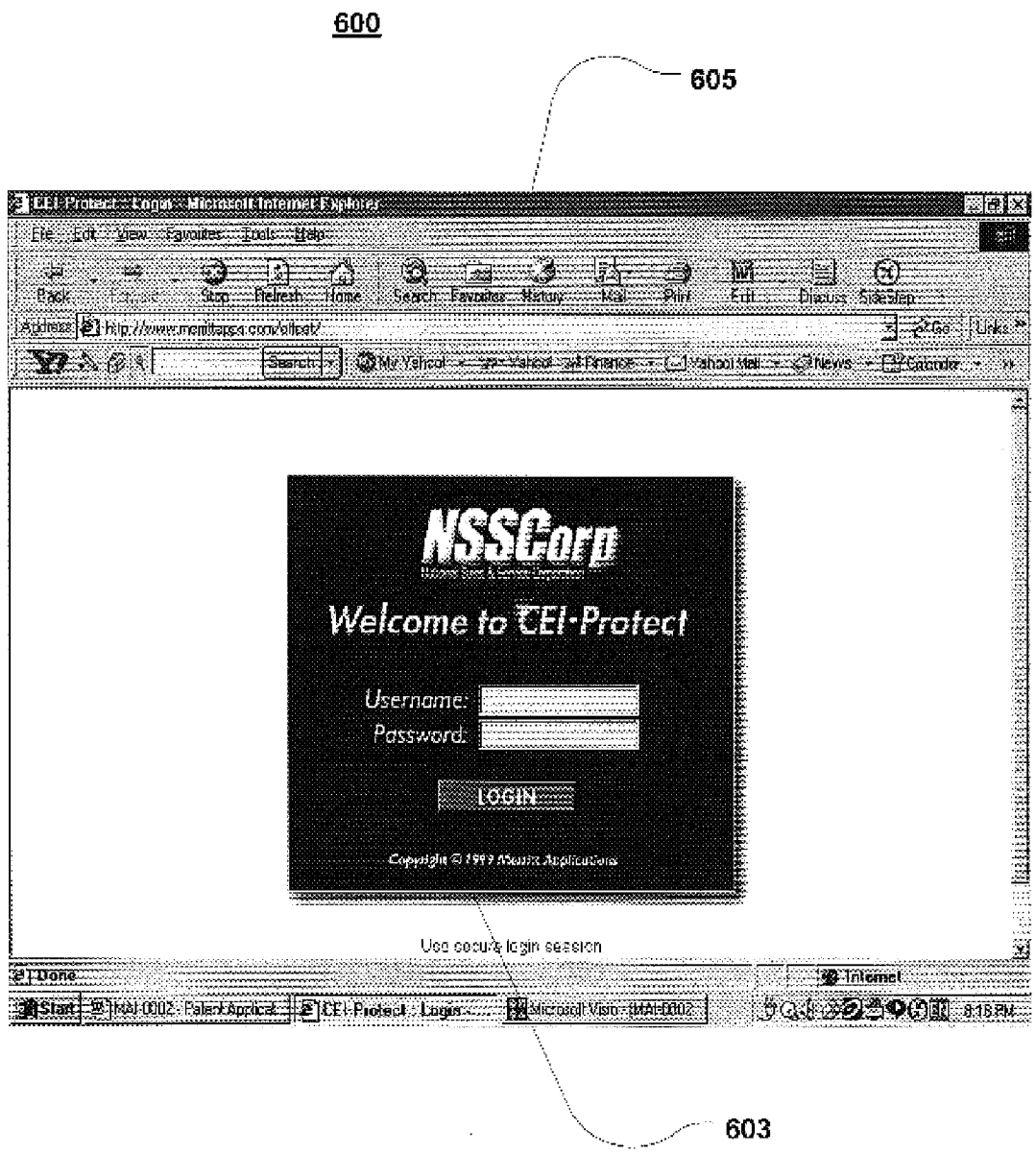
Figure 6A:
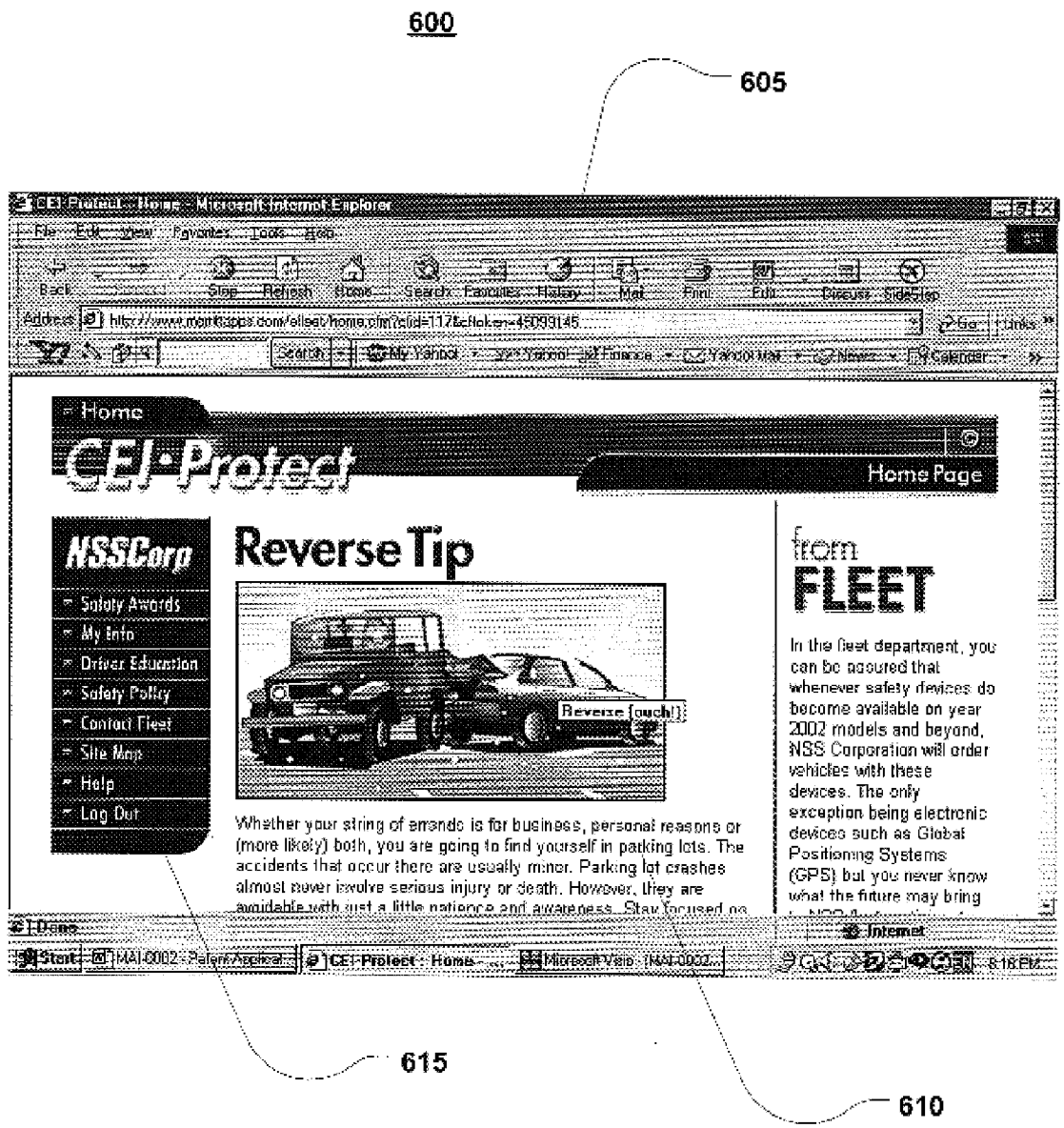
Figure 6B:
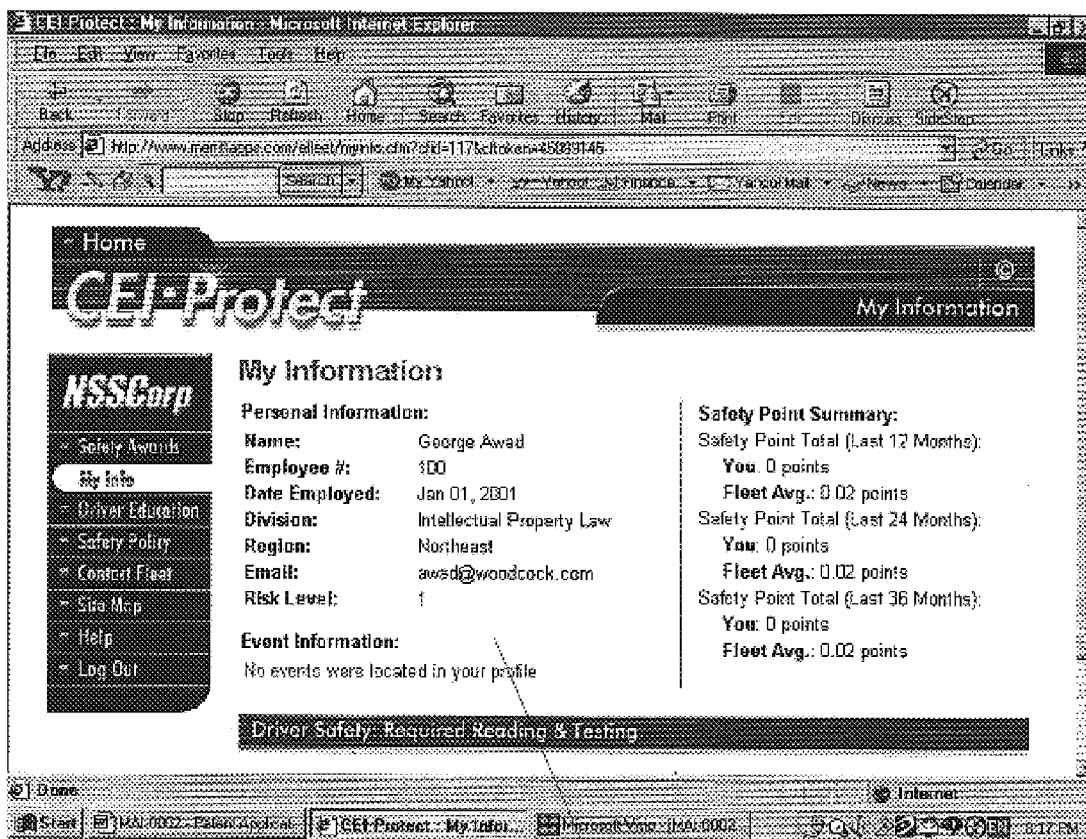
Figure 7:
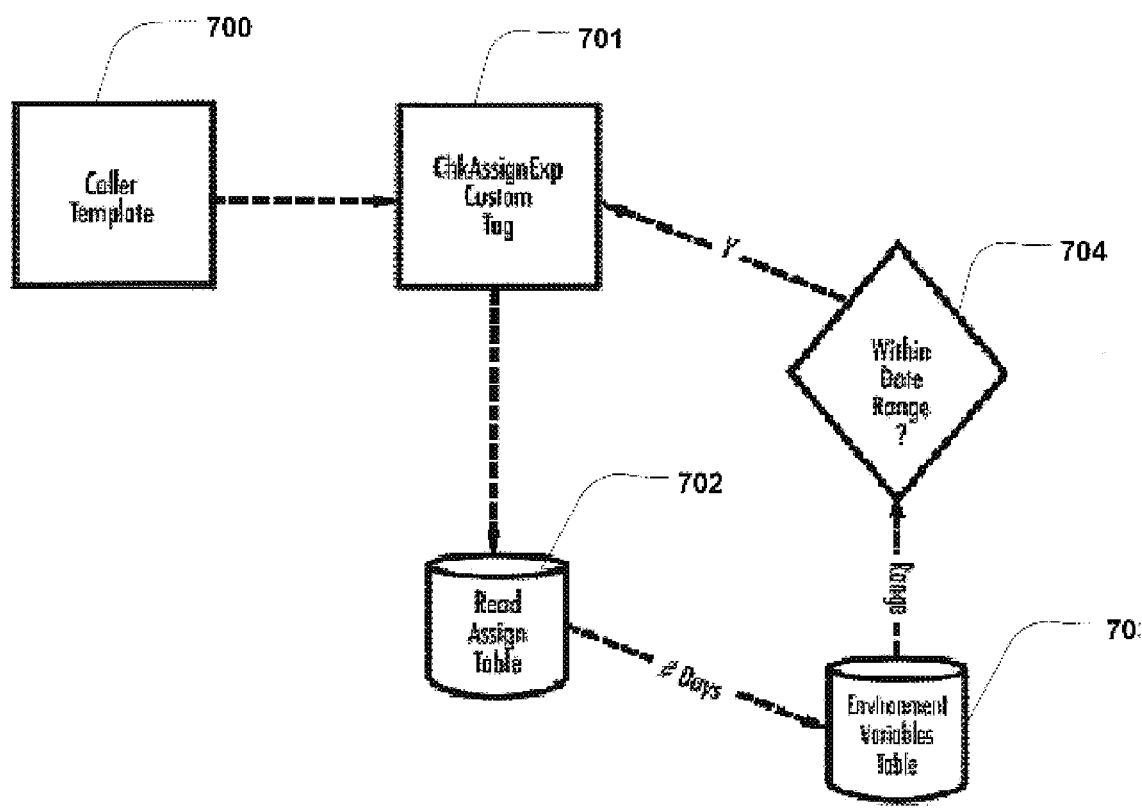
Figure 7A:
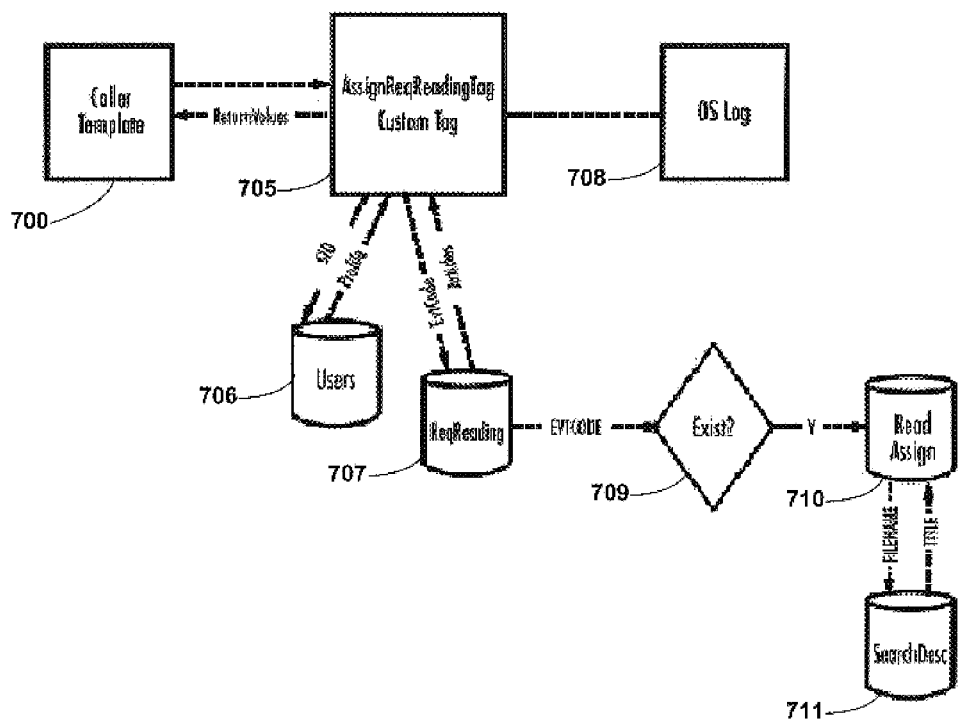
Figure 7B:
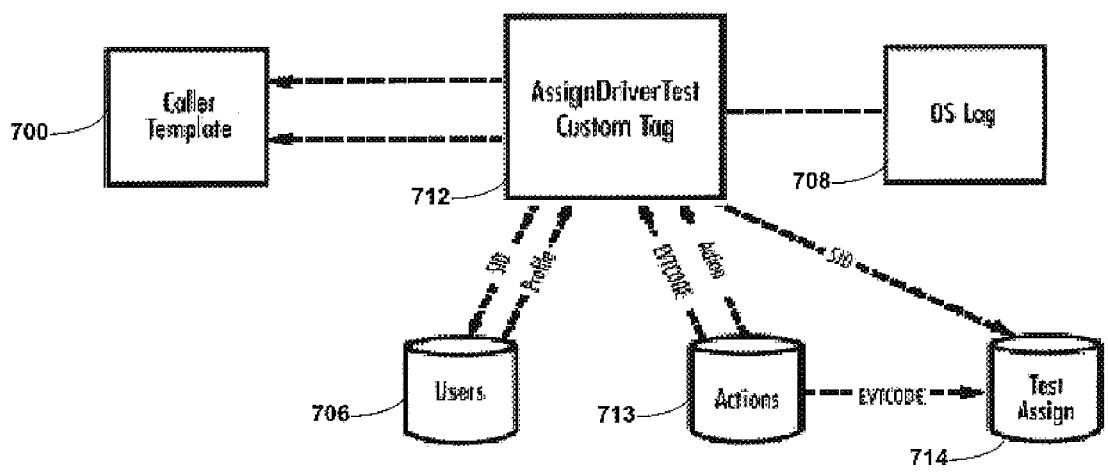
Figure 7C:
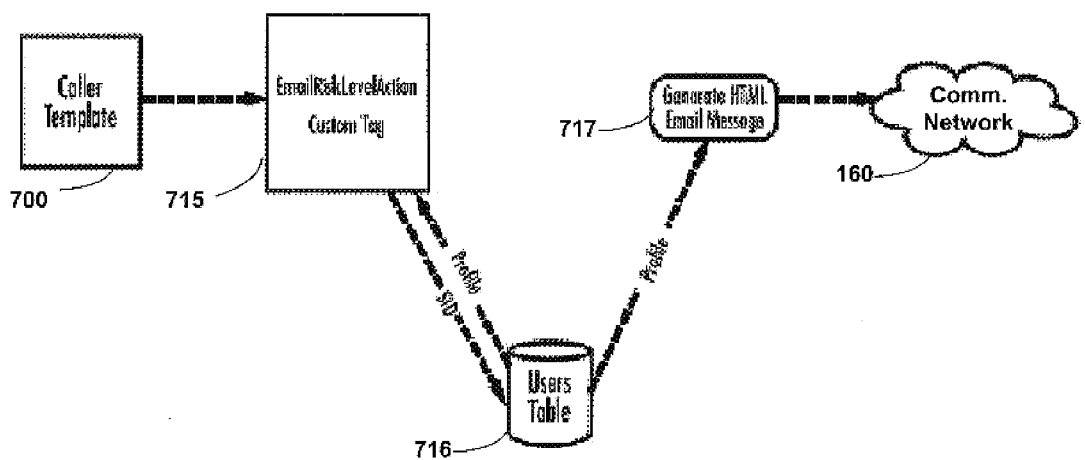
Figure 7D:
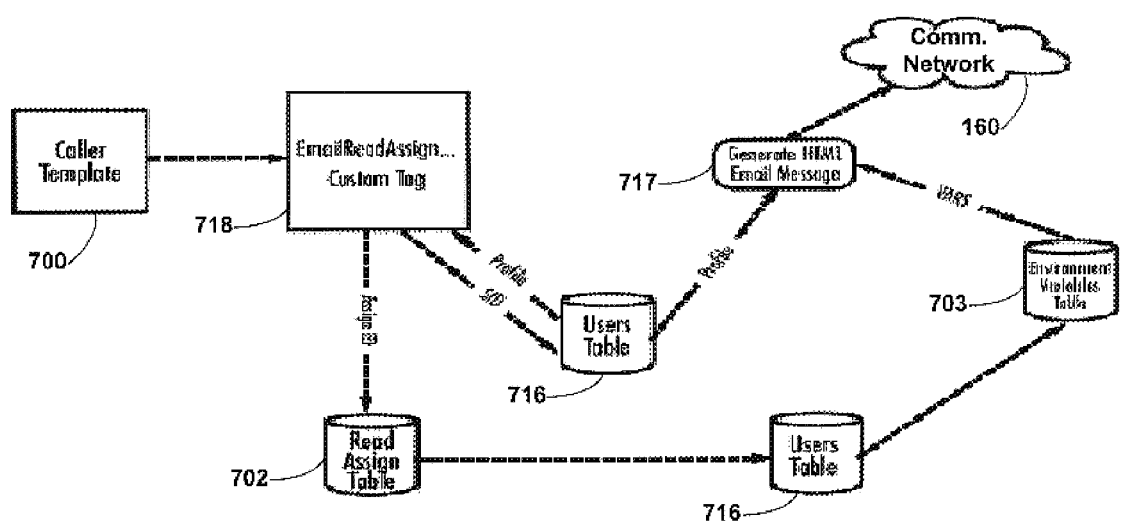
Figure 7E:
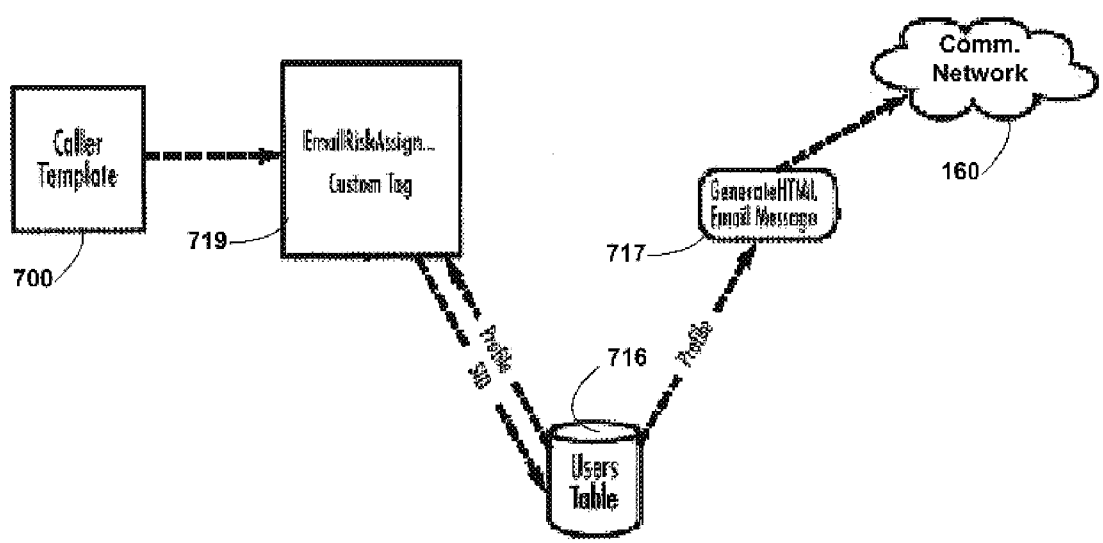
Figure 7F:
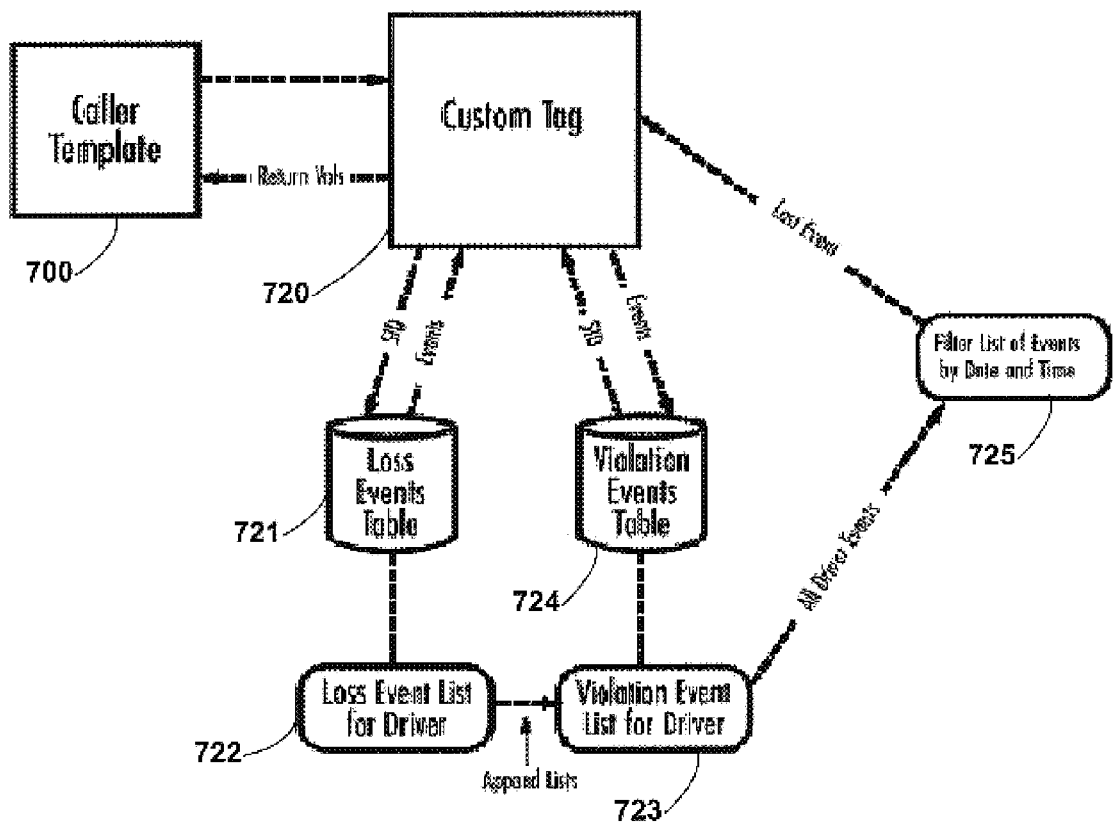
Figure 7G:
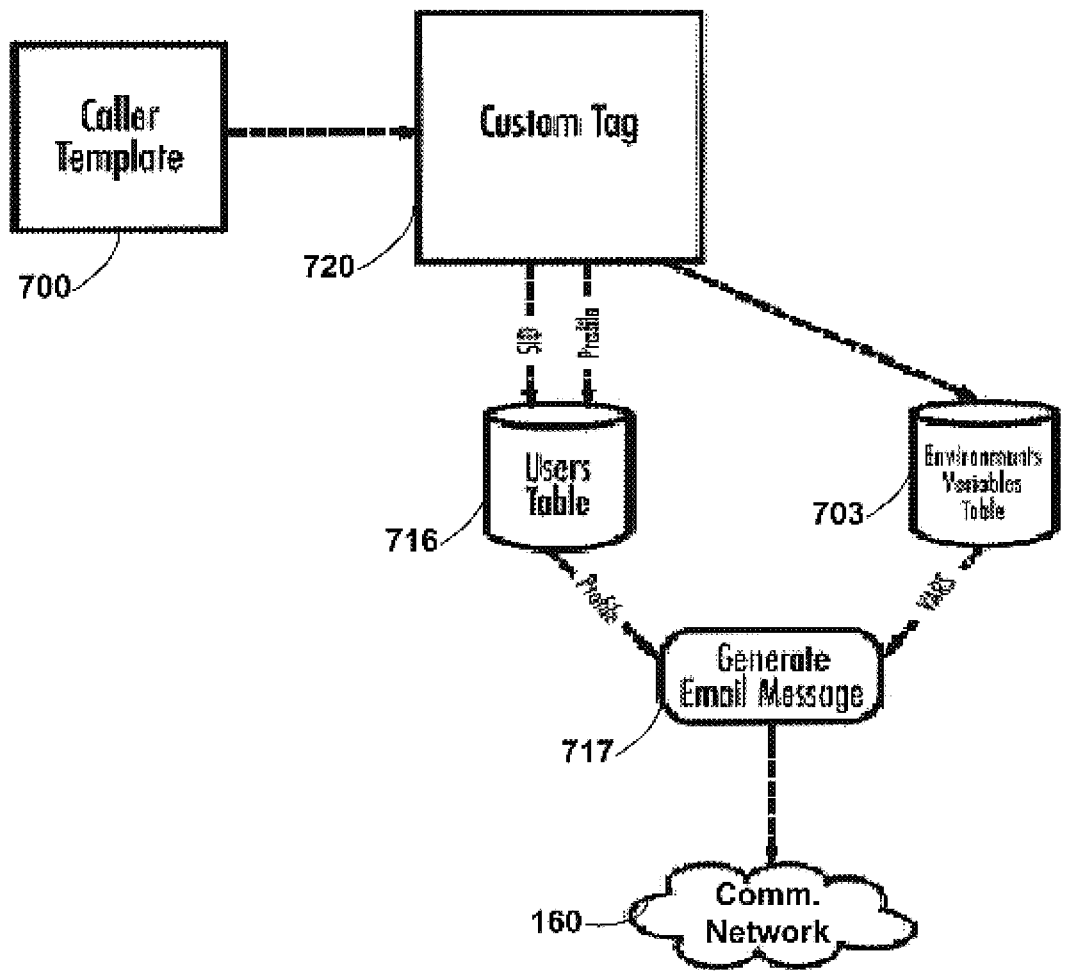
Figure 7H:
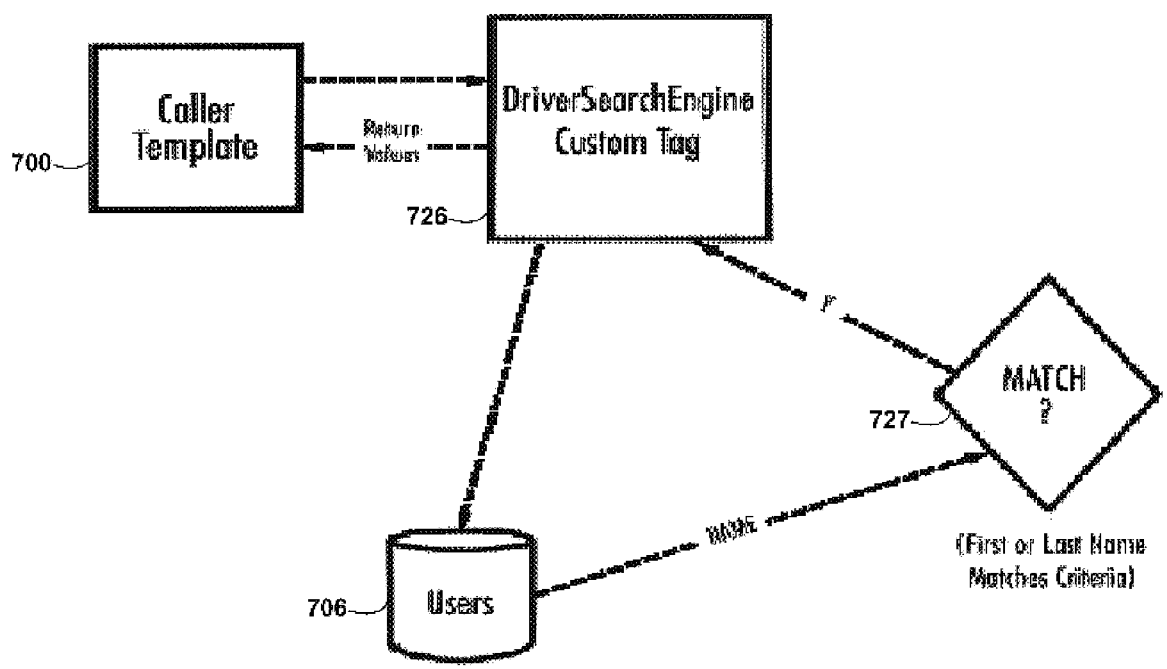
Figure 7I:
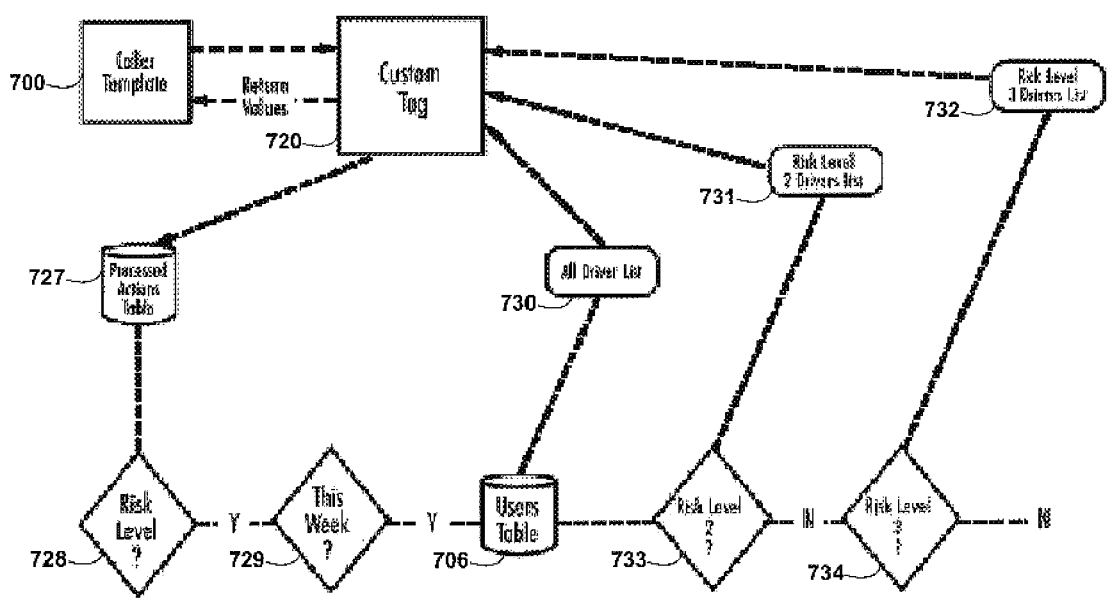
Figure 7J:
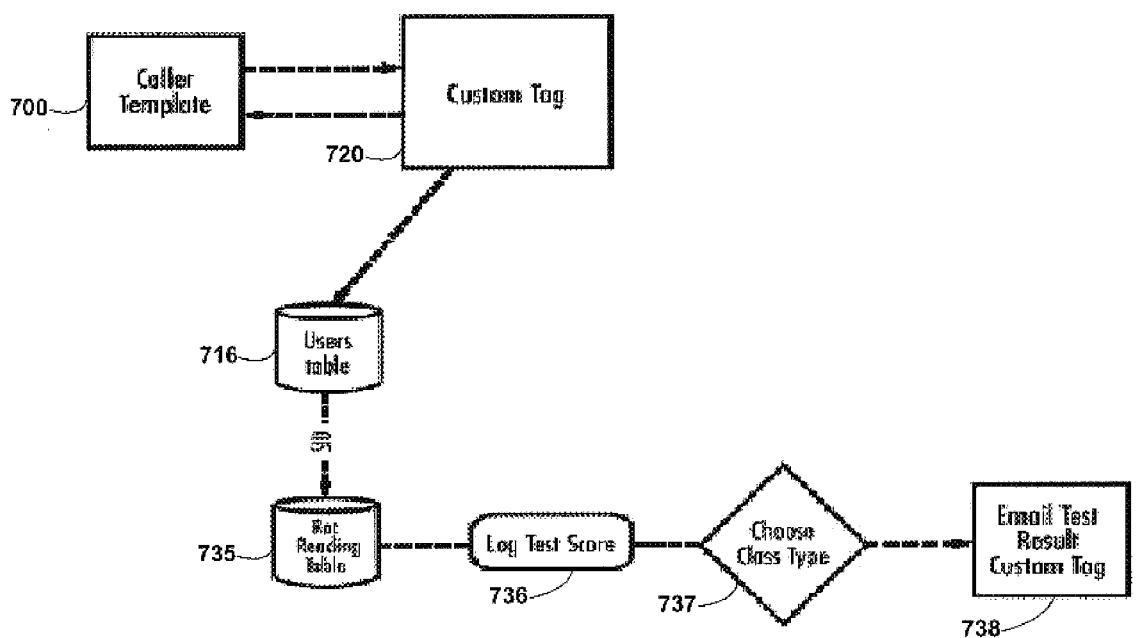
Figure 7K:
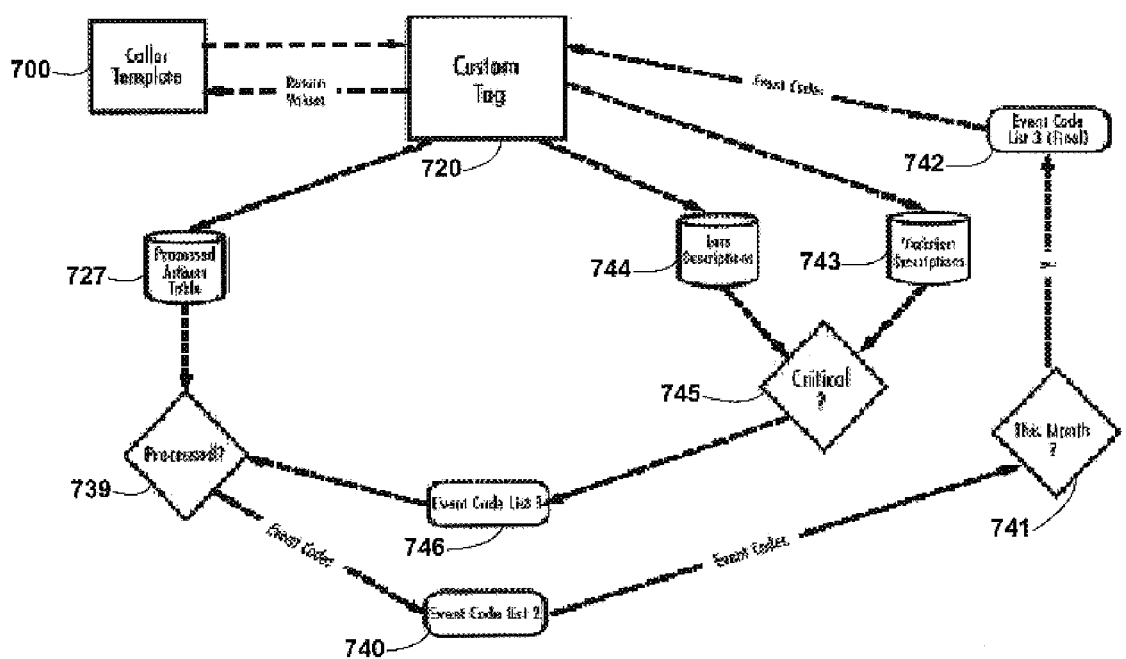
Figure 7L:
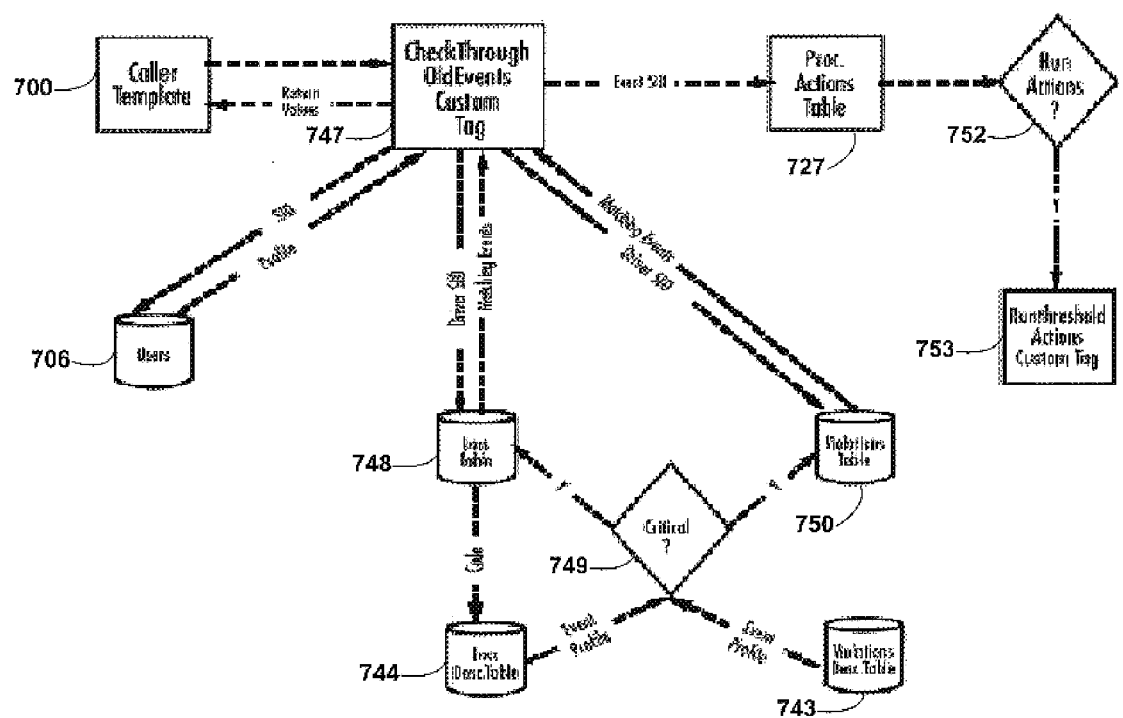
Figure 7M:
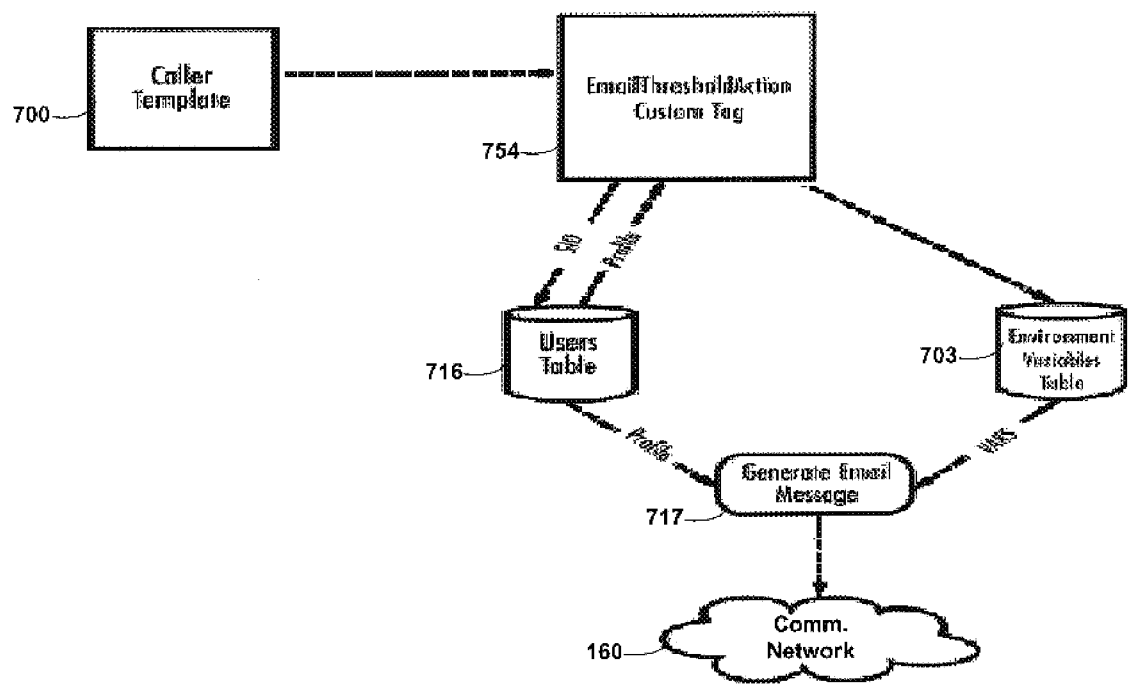
Figure 7N:
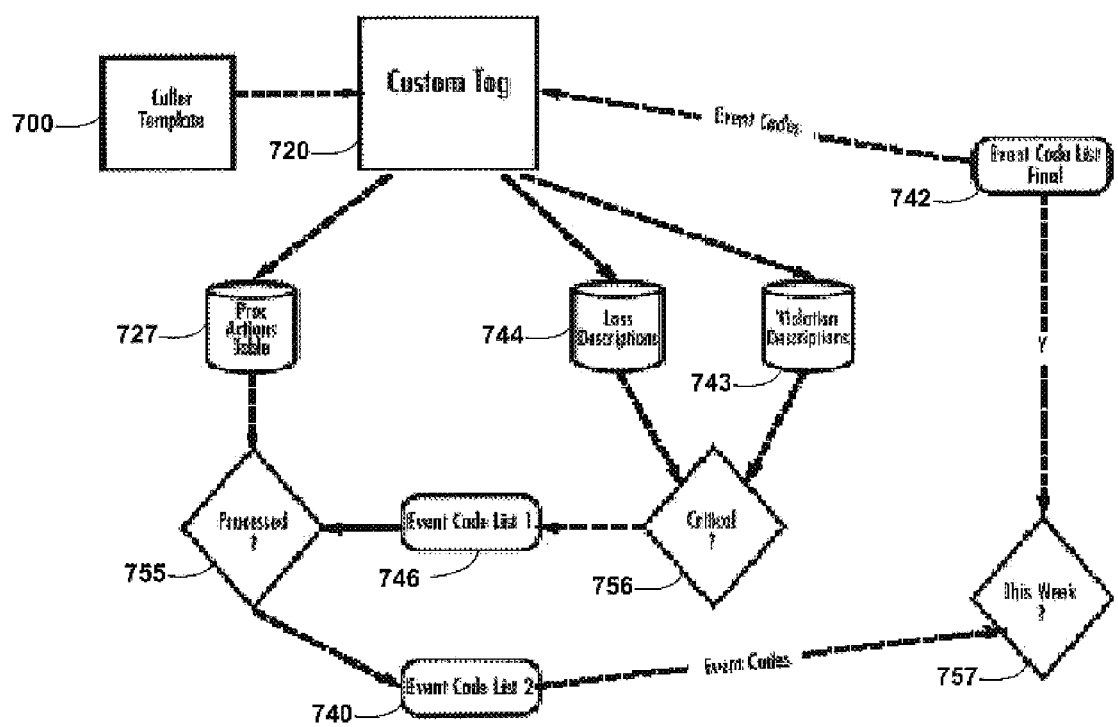
Figure 7O:
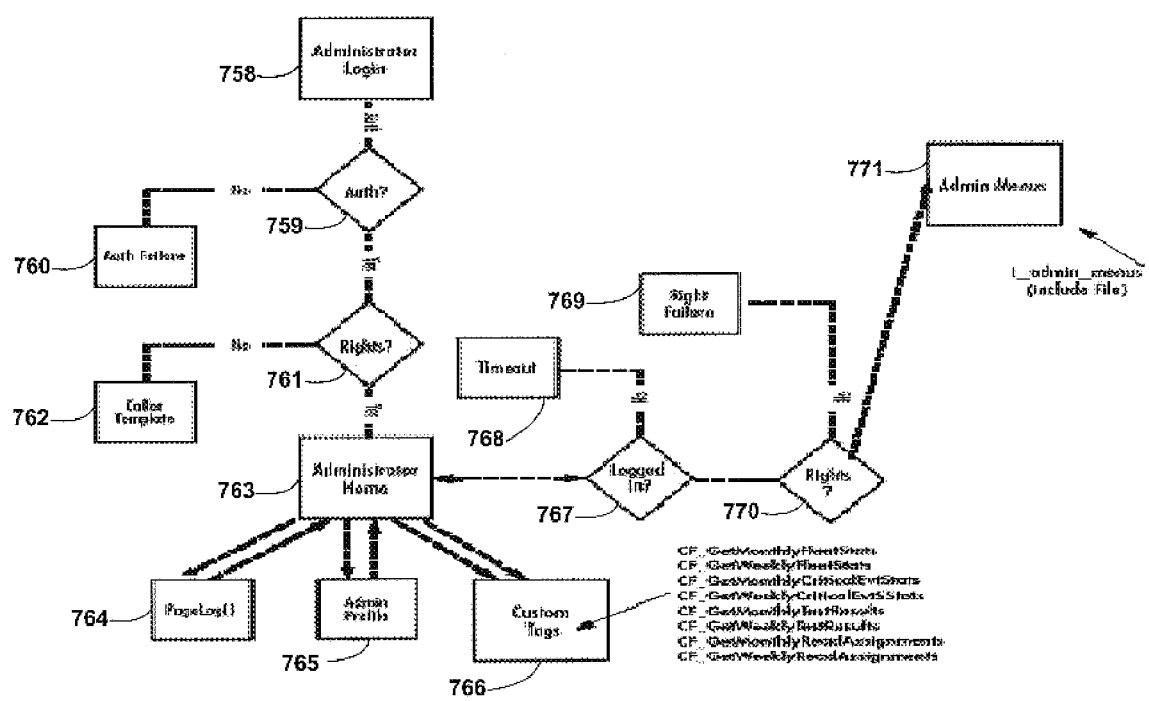
Figure 7P:
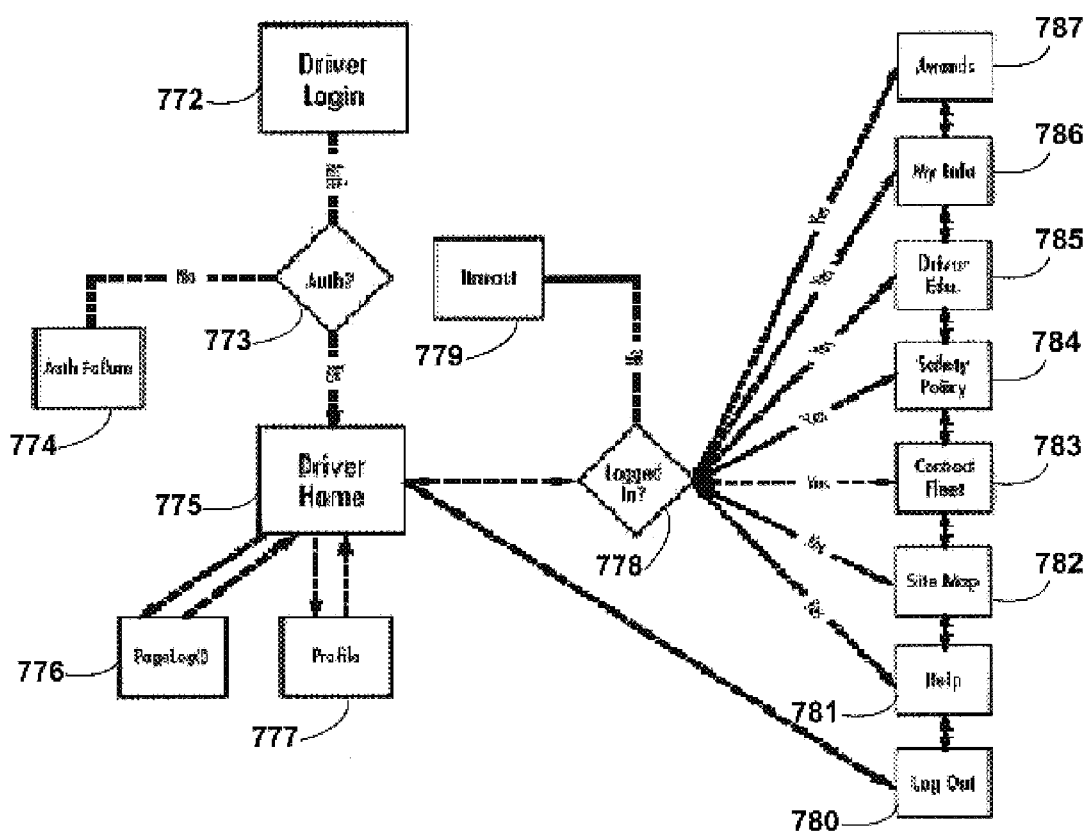
Figure 7Q:
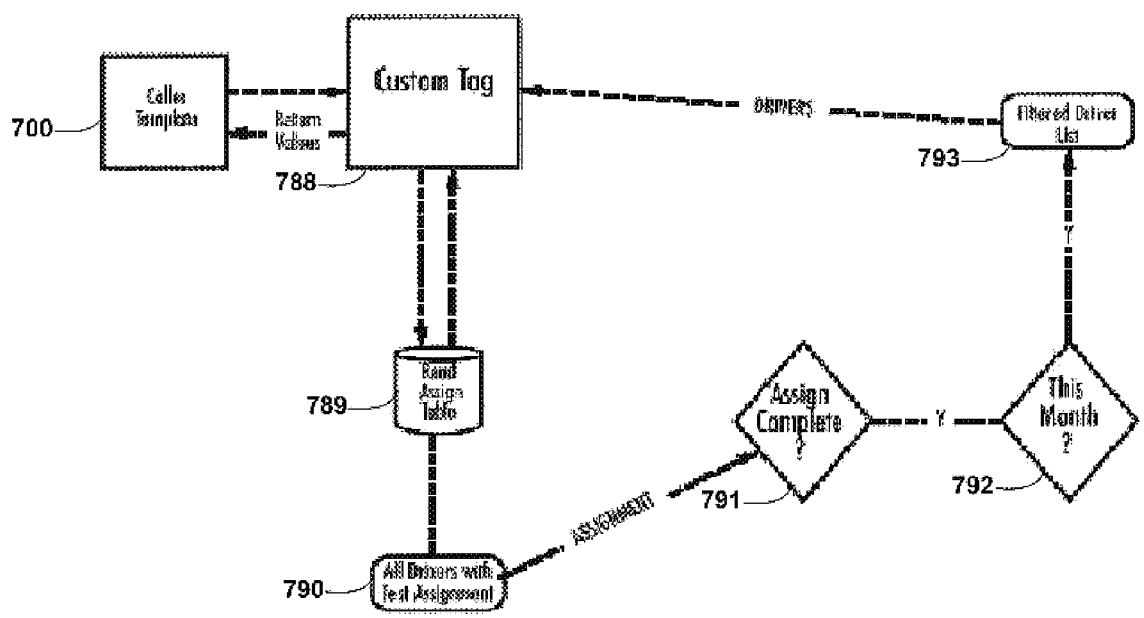
Figure 7R:
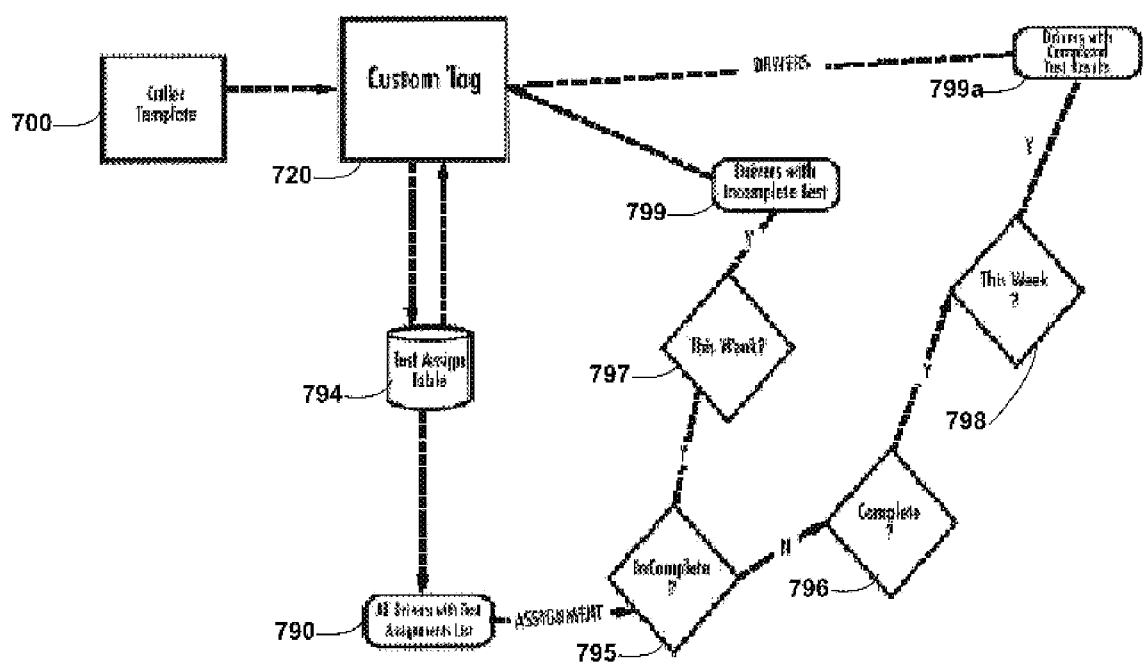
Figure 7S:
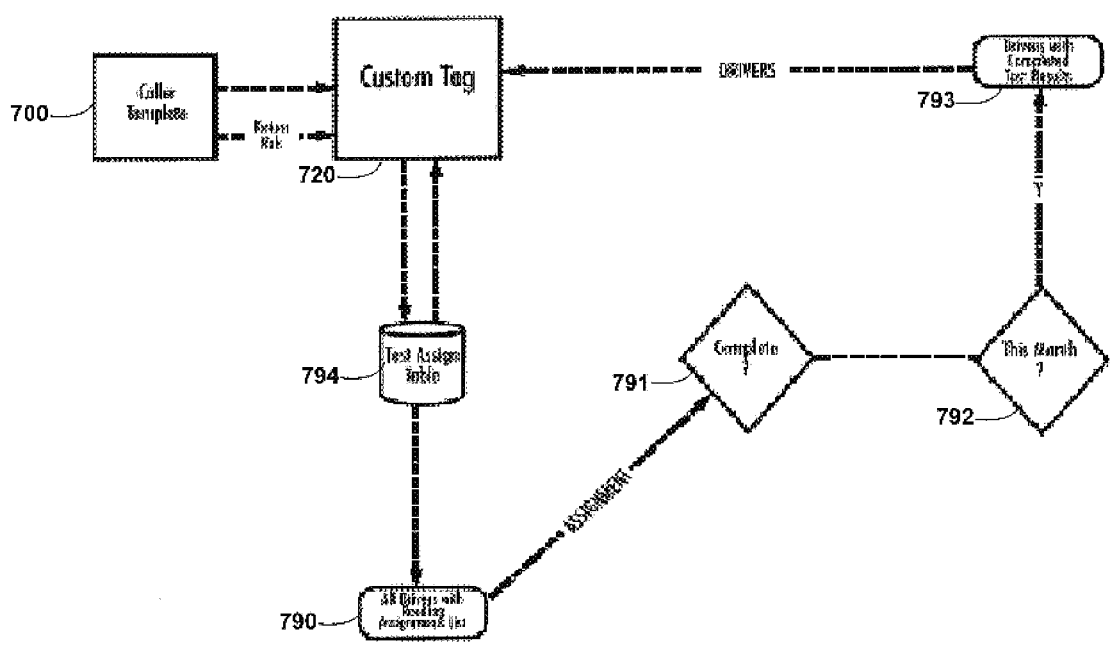
Figure 7T:
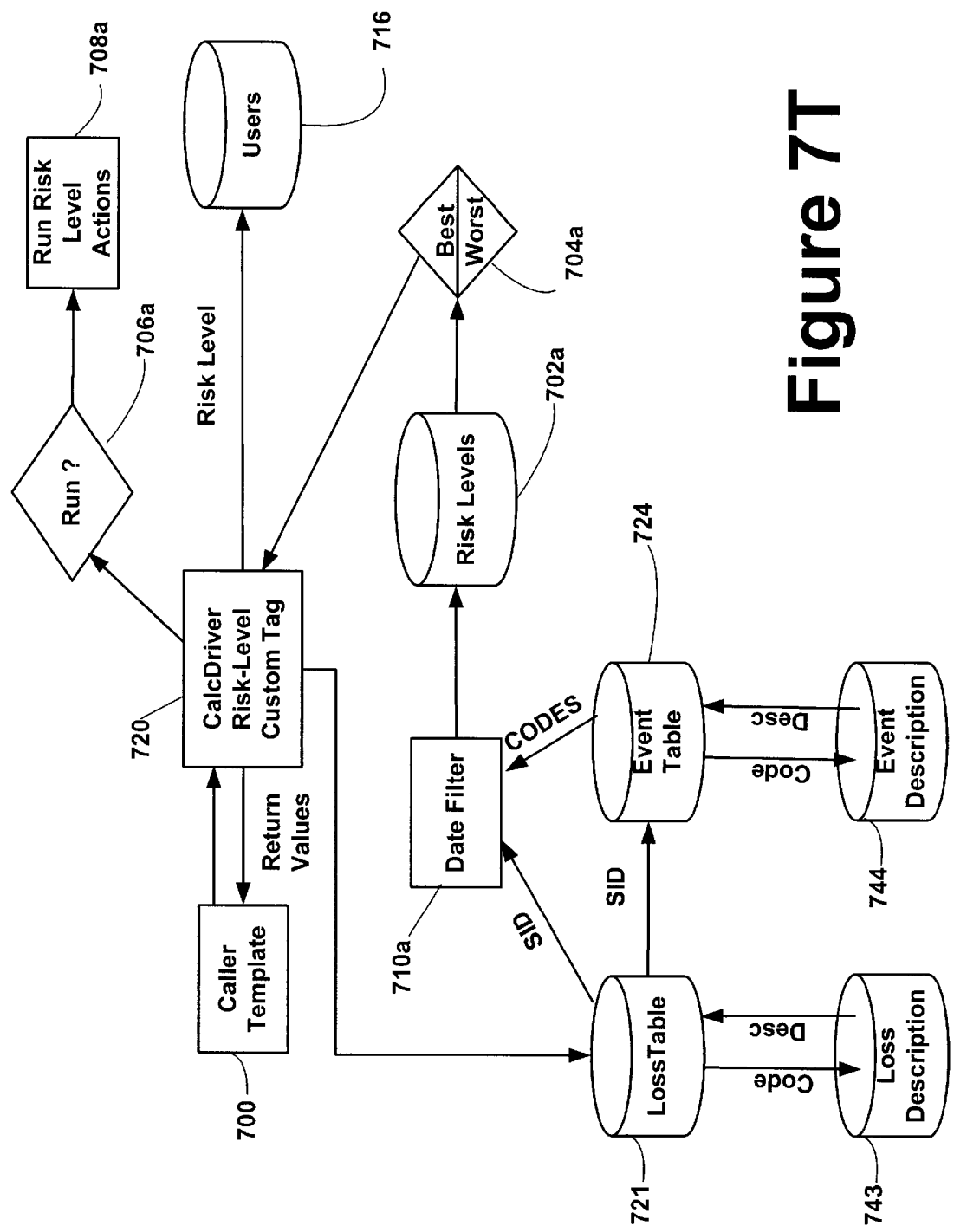

FIGS. 5, 5A, and 5B are screen shots of an exemplary computing application offering administrator interface areas in accordance with the present invention;

FIGS. 6, 6A, and 6B are screen shots of an exemplary computing application offering driver interface areas in accordance with the present invention; and FIG. 7 is a flowchart of processing performed when executing the check assignment feature of the present invention;

FIG. 7A is a flowchart of the processing performed when executing the assign required reading feature of the present invention;

FIG. 7B is a flowchart of the processing performed when executing the assign driver test feature of the present invention;

FIG. 7C is a flowchart of the processing performed when executing the e-mail risk level action feature of the present invention;

FIG. 7D is a flowchart of the processing performed when executing the e-mail read assignments feature of the present invention;

FIG. 7E is a flowchart of the processing performed when executing the e-mail risk assignment feature of the present invention;

FIG. 7F is a flowchart of the processing performed when executing a feature listing driver and/or events in accordance with the present invention;

FIG. 7G is a flowchart of the processing performed when executing a feature to generate e-mail messages having information about driver and/or vehicle events in accordance with the present invention;

FIG. 7H is a flowchart of the processing performed when executing a search feature to find drivers and/or vehicle information in accordance with the present invention;

FIG. 7I is a flowchart of the processing performed when executing a feature that determines drivers/vehicles that had changes in risk level during the current week in accordance with the present invention;

FIG. 7J is a flowchart of the processing performed when executing a feature that records the test score for offered remediation and communicates the test score to a list of recipients and/or organizational hierarchy in accordance with the present invention;

FIG. 7K is a flowchart of the processing when executing a feature that determines the critical events, categories, and drivers creating critical events during the current month in accordance with the present invention;

FIG. 7L is a flowchart of the processing performed when executing a feature that scans the events looking for critical events in accordance with the present invention;

FIG. 7M is a flowchart the processing performed when executing a feature that communicates when a driver and/or vehicle has engaged in a critical event in accordance with the present invention;

FIG. 7N is a flowchart of the processing performed when executing a feature that determines critical events, categories, and drivers creating those events in the current week in accordance with the present invention;

FIG. 7O is a flowchart of the processing performed for an administrator navigating in the administrator interface portion of an exemplary computing application in accordance with the present invention;

FIG. 7P is a flowchart of the processing performed for a driver/vehicle navigating in the driver/vehicle interface portion of an exemplary computing application in accordance with the present invention;

FIGS. 7Q and 7S are flowcharts of the processing performed to execute features that determine users that have completed the required remediation during the current week and current month in accordance with the present invention;

FIG. 7R is a flowchart of the processing performed to execute a feature that determines which participating users have completed assigned remediation progress measures during a given week in accordance with the present invention; and FIG. 7T shows the processing performed to execute a feature that determines drivers' and/or vehicles' current risk levels and total safety points aggregated over a predetermined period of time in accordance with the present invention.

DETAILED DESCRIPTION OF ILLUSTRATIVE EMBODIMENTS

Overview

The present invention aims to ameliorate the shortcomings of current driver monitoring practices. In an illustrative implementation, the present invention provides an analytical system and methods that accept and collect records of driver performance (and/or alternatively vehicle status), analyzes the risk levels and weaknesses of individual drivers (and/or alternatively of anyone driving a specific vehicle), and based on those records assigns educational materials and other responses to drivers (and/or alternatively the vehicle managers, operators, or owners), notifies administrators of monitored individuals and groups of drivers (and/or vehicles), and informs administrators of driver behavior (and/or alternatively vehicle uses), risk level, critical events, remediation, and system use. As such, the present invention provides a completely automated driver-centric and/or vehicle-centric approach to monitoring and managing drivers and vehicles in an effort to promote driver safety. In the implementation, the systems and methods of the present invention can be driver-centric thereby monitoring and reporting driver events to provide, track, and grade driver safety education for offending drivers so as to promote safer driving. Alternatively and/or conjunctively, the system and methods of the present invention can be vehicle-centric thereby monitoring and reporting vehicle accident/incident status so as to provide suggestions to improve the vehicle to promote safer driving of that vehicle.

As will be described below with respect to FIGS. 1–7T, the present invention is directed to systems and methods that enable the collection, processing, and distribution of information to promote driving safety. In accordance with an illustrative implementation thereof, the present invention comprises systems and methods that automatically couples administrators of drivers (and/or alternatively vehicles) with driver/vehicle information for use to promote safety.

In an illustrative implementation, described more fully hereinafter, the methods and apparatus of the present invention may be implemented as part of a computing application, EFLEETMANAGER™ provided by MERRITT APPLICATIONS, INC™, assignee of the present invention. Although the depicted embodiment provides systems and methods employing exemplary computing devices having a particular configuration, those skilled in the art will appreciate that the inventive concepts described herein extend to various types of computing devices having varying configurations and that execute on various computing platforms.

Illustrative Computing Environment

Figure 1:
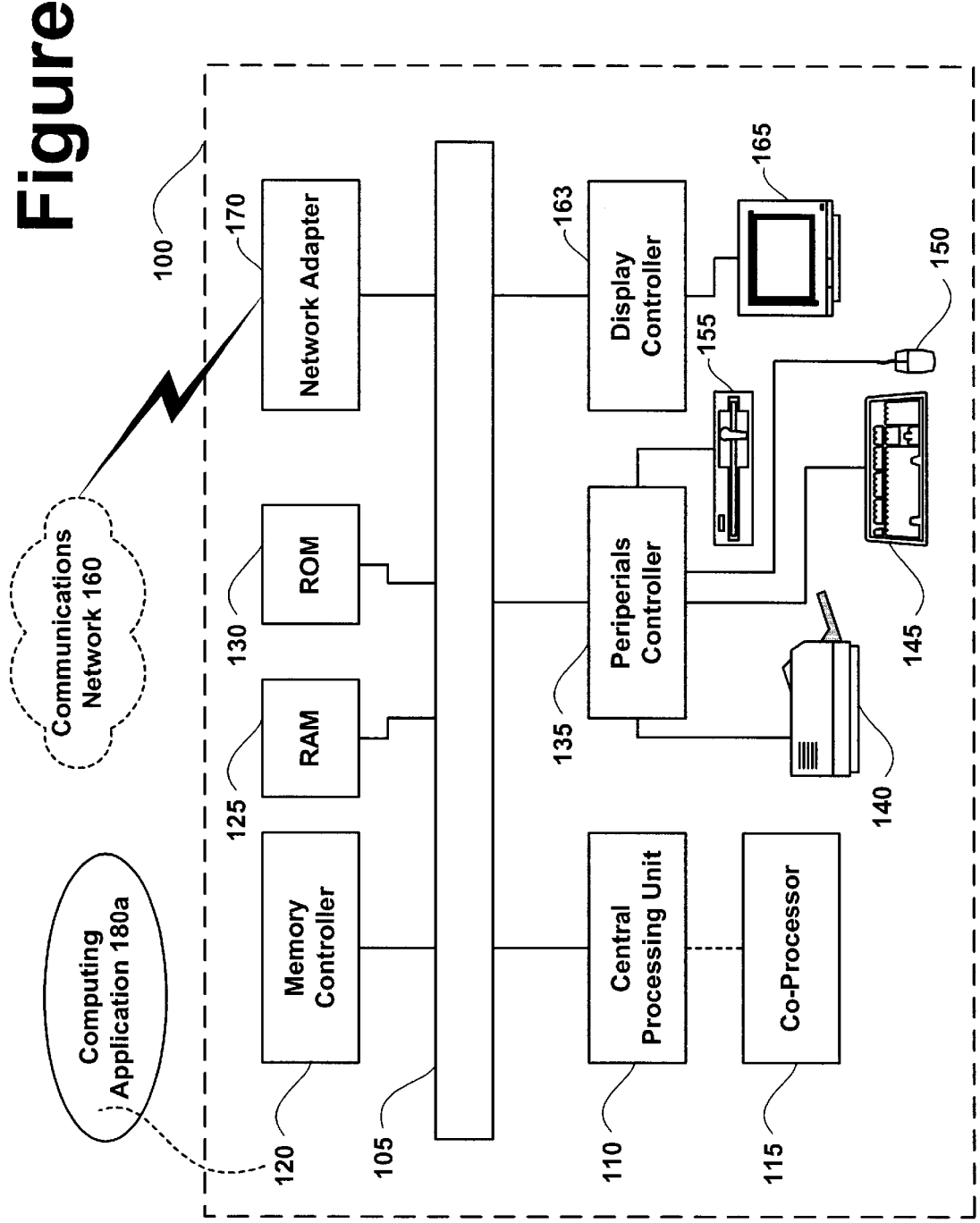
FIG. 1 is a block diagram of an exemplary computing environment in accordance with the present invention.

FIG. 1 depicts an exemplary computing system 100 in accordance with the invention. Computing system 100 is capable of executing an exemplary computing application 180a that allows users to collect, process, and distribute information to promote safe driving. Exemplary computing system 100 is controlled primarily by computer readable instructions, which may be in the form of software, wherever, or by whatever means such software is stored or accessed. Such software may be executed within central processing unit (CPU) 110 to cause data processing system 100 to do work. In many known workstations and personal computers central processing unit 110 is implemented by a single-chip CPU called a microprocessor. Coprocessor 115 is an optional processor, distinct from main CPU 110, that performs additional functions or assists CPU 110. One common type of coprocessor is the floating-point coprocessor, also called a numeric or math coprocessor, which is designed to perform numeric calculations faster and better than general-purpose CPU 110. Recently, however, the functions of many coprocessors have been incorporated into more powerful single-chip microprocessors.

In operation, CPU 110 fetches, decodes, and executes instructions, and transfers information to and from other resources via the computer's main data-transfer path, system bus 105. Such a system bus 105 connects the components in computing system 100 and defines the medium for data exchange. System bus 105 typically includes data lines for sending data, address lines for sending addresses, and control lines for sending interrupts and for operating the system bus 105. An example of such a system bus is the PCI (Peripheral Component Interconnect) bus. Some of today's advanced busses provide a function called bus arbitration that regulates access to the bus by extension cards, controllers, and CPU 110. Devices that attach to these busses and arbitrate to take over the bus are called bus masters. Bus master support also allows multiprocessor configurations of the busses to be created by the addition of bus master adapters containing a processor and its support chips.

Memory devices coupled to system bus 105 include random access memory (RAM) 125 and read only memory (ROM) 130. Such memories include circuitry that allows information to be stored and retrieved. ROMs 130 generally contain stored data that cannot be modified. Data stored in RAM 125 can be read or changed by CPU 110 or other hardware devices. Access to RAM 125 and/or ROM 130 may be controlled by memory controller 120. Memory controller 120 may provide an address translation function that translates virtual addresses into physical addresses as instructions are executed. Memory controller 120 may also provide a memory protection function that isolates processes within the system and isolates system processes from user processes. Thus, a program running in user mode can access only memory mapped by its own process virtual address space; it cannot access memory within another process's virtual address space unless memory sharing between the processes has been set up.

In addition, computing system 100 may contain peripherals controller 135 responsible for communicating instructions from CPU 110 to peripherals, such as, printer 140, keyboard 145, mouse 150, and disk drive 155.

Display 165, which is controlled by display controller 160, is used to display visual output generated by computing system 100. Such visual output may include text, graphics, animated graphics, and video. Display 165 may be implemented with a CRT-based video display, an LCD-based flat-panel display, gas plasma-based flat-panel display, or a touch-panel. Display controller 160 includes electronic components required to generate a video signal that is sent to display 165.

Further, computing system 100 may contain network adaptor 170 which may be used to connect computing system 100 to an external communications network 160. Communications network 160 may provide computer users with means of communicating and transferring software and information electronically. Additionally, communications network 160 may provide distributed processing, which involves several computers and the sharing of workloads or cooperative efforts in performing a task. It will be appreciated that the network connections shown are exemplary and other means of establishing a communications link between the computers may be used. In exemplary implementations, computer network 160 may comprise any of a fixed-wire LAN, a wireless LAN, a fixed-wire WAN, a wireless WAN, a fixed-wire intranet, a wireless intranet, a fixed-wire extranet, a wireless extranet, cellular telephony, wireless paging, the Internet, and the wireless Internet.

Illustrative Computer Network Environment

Figure 2:
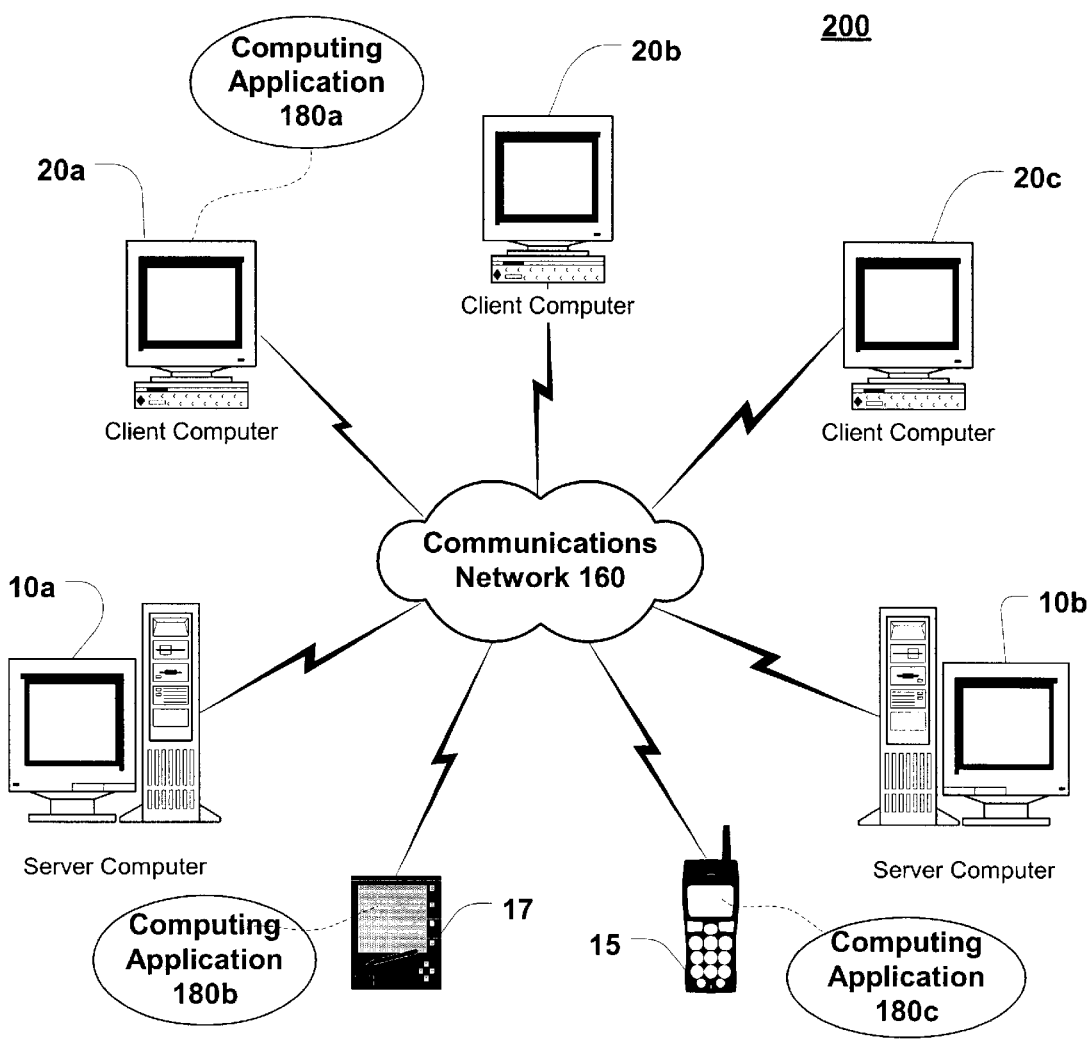
FIG. 2 is a block diagram of an exemplary computing network environment in accordance with the present invention.

As noted above, the computer described with respect to FIG. 1 can be deployed as part of a computer network. In general, the above description applies to both server computers and client computers deployed in a network environment. FIG. 2 illustrates an exemplary network environment 200, with server computers 10a, 10b in communication with client computers 20a, 20b, 20c via a communications network 160, in which the present invention may be employed. As shown in FIG. 2, a number of servers 10a, 10b, etc., are interconnected via a communications network 160 (which may be a LAN, WAN, intranet or the Internet) with a number of client computers 20a, 20b, 20c, or computing devices, such as, mobile phone 15 and personal digital assistant 17. In a network environment in which the communications network 160 is the Internet, for example, the servers 10a, 10b, etc. can be Web servers with which the clients 15, 17, and 20a, 20b, 20c communicate via any of a number of known protocols, such as, hypertext transfer protocol (HTTP) or wireless application protocol (WAP), as well as other known communication protocols. Each client computer 20 can be equipped with computing application 180a to gain access to the servers 10. In alternative implementations, communications network may comprise a fixed-wire LAN, a wireless LAN, a fixed-wire WAN, a wireless WAN, a fixed-wire intranet, a wireless intranet, a fixed-wire extranet, a wireless extranet, cellular telephony, wireless paging, the Internet, and the wireless Internet. Similarly, personal digital assistant 17 can be equipped with computing application 180b and mobile phone 15 can be equipped with computing application 180c to display received data.

Thus, the present invention can be utilized in a computer network environment having client computing devices for accessing and interacting with the network and a server computer for interacting with client computers. However, the systems and methods for providing adaptable rendering of data of the present invention can be implemented with a variety of network-based architectures, and thus should not be limited to the example shown. The present invention will now be described in more detail with reference to a presently illustrative implementation.

Figure 3:
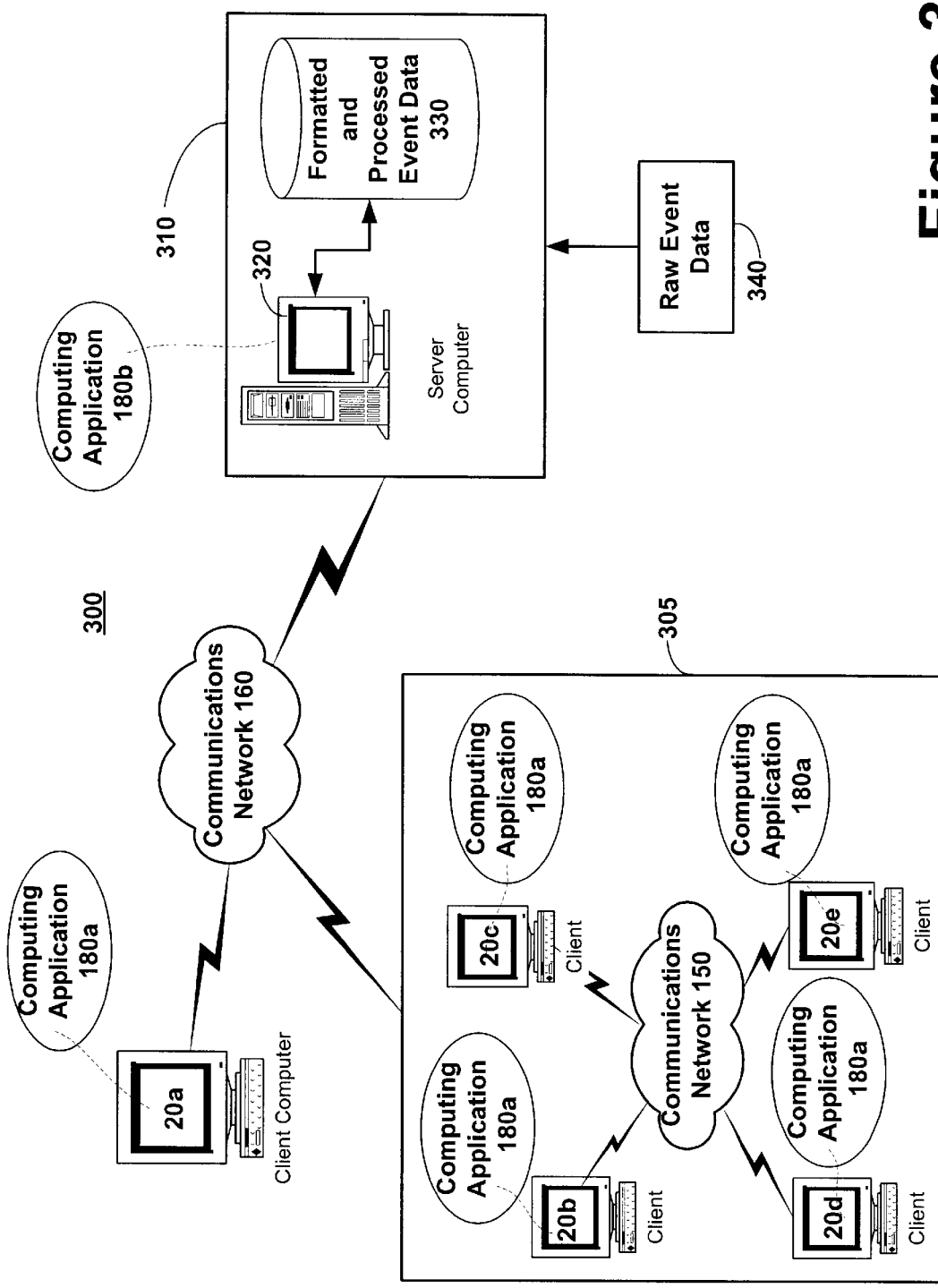
FIG. 3 is a block diagram showing the communication flow of data among cooperating components of the present invention.

FIG. 3 depicts an exemplary driving safety information system 300 for the collection, processing, and distribution of information that promotes safer driving. Driving safety information system 300 comprises client computer 20a running an exemplary driving safety promotion computing application 180a communicating with safety information processing system 310 over communications network 160. Further, driving safety information system 300 contemplates cooperation with other computer networks such as computer network 305. Computer network 305 may comprise client computers 20b, 20c, 20d, and 20e all running the exemplary driving safety promotion computing application 180a. Client computers 20b, 20c, 20d, and 20e may communicate with each other over communications network 150 and communicate data to safety information processing system 310 over communications network 160. In turn, safety information processing system 310 is electronically coupled to providers of raw event data 340. Examples of raw event data may include but are not limited to third party vendors of driver/vehicle information, and city, local, and state authorities/and or administrative agencies having driver and/or vehicle information. Safety information processing system 310 comprises computer server 320 executing safety information processing computing application 180b and cooperating with formatted and processed event data store 330. Safety information processing system computing application 180b comprises a processing area that accepts raw event data 340 and standardizes the data according to a pre-defined list of events. In addition, as will be described in more detail below, safety information processing computing application 180b assigns risk levels to the standardized data for storage in formatted and processed event data store 330.

In operation, a participating user may request information from formatted and processed event data store 330 by inputting the request through computing application 180a residing on any client computer 20a, 20b, 20c, 20d, or 20e. Safety information processing computing application 180b cooperates with computing application 180a to offer different data depending on the participating user. In the case of an inquiry from an administrator of a driver/vehicle fleet, administrator level information is provided. Administrator level information includes but is not limited to driver/vehicle events, risk levels for drivers/vehicles, driver remediation, vehicle maintenance, analysis reports, and system use. The information is communicated back to client computers 20a, 20b, 20c, 20d, and 20e by computer server 320 using communication network 160. Comparatively, when a driver requests information from driving safety information system 300, driver level information is provided. Exemplary driver level information includes but is not limited to, remediation information, risk level information, event information, and system use information for driver.

Figure 3A:
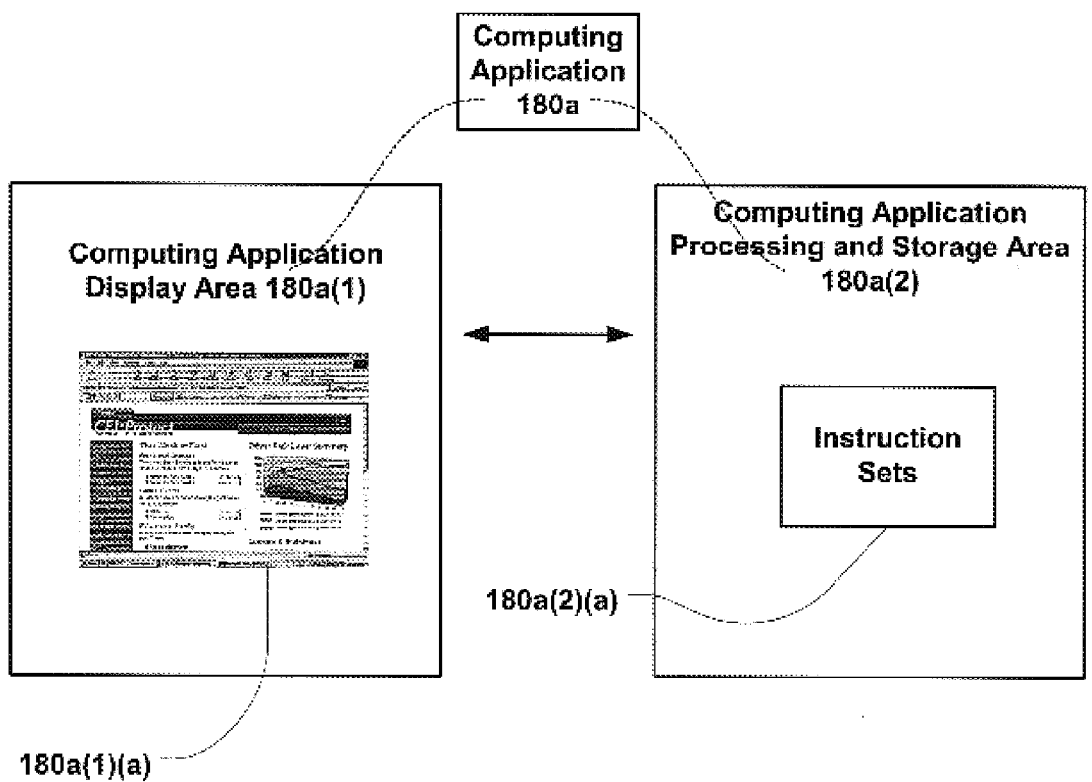
FIG. 3A is a block diagram showing the components of a first exemplary driver safety information computing application in accordance with the present invention.

FIG. 3A shows the cooperating components of exemplary computing applications 180a. As shown, computing application 180a comprises computing application display area 180a(1) and computing application processing and storage area 180a(2). Computing application display area 180a(1) may comprise content 180a(1)(a) providing information indicative of driving safety and interface content allowing participating users (not shown) to interact with the display content. Comparatively, computing application processing and storage area 180a(2) may comprise instruction sets 180a(2)(a) that offer instructions for the display and interface with content 180a(1)(a). In operation, the computing application 180a may receive data that is processed and stored by computing application processing and storage area 180a(2). The data may be processed in accordance with instruction sets 180a(2)(a). The processed data may be passed to computing application display area 180a(1) for display to a participating user (not shown).

Figure 3B:
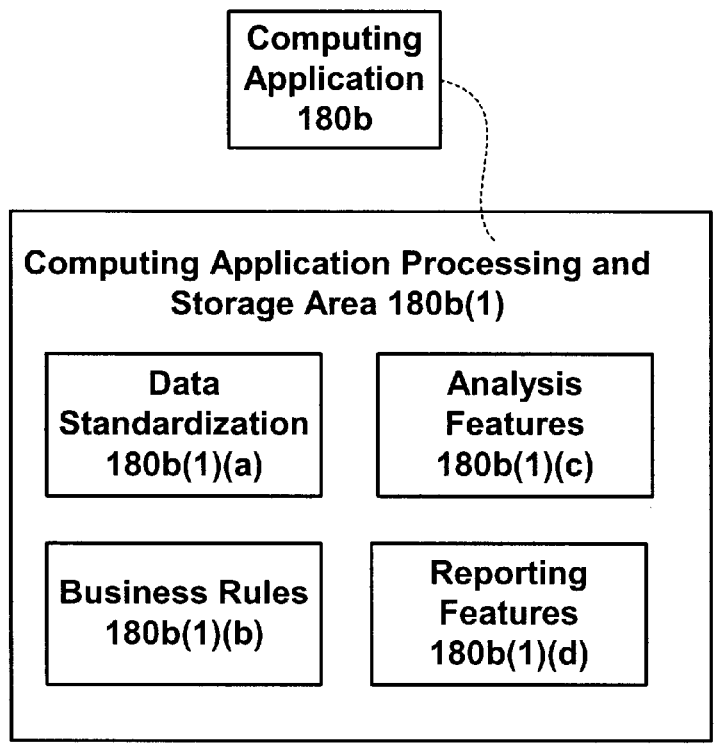
FIG. 3B is a block diagram showing the cooperation of components of a second exemplary driver safety information computing application in accordance with the present invention.

FIG. 3B shows cooperating components of exemplary safety information processing computing application 180b. As shown, computing application 180b comprises computing as application processing and storage area 180b(1). Computing application processing and storage area 180b(1) supports a number of processing modules for use to process safety information in an effort to promote safer driving. In FIG. 3B, exemplary processing modules are provided to show some of the processing features of the safety information processing computing application 180b. As shown, computing application and storage area 180b(1) of safety information processing computing application 180b can support data standardization processing module 180b(1)(a), business rules processing module 180b(1)(b), analysis features processing module 180*b*(1)(*c*) and reporting features 180*b*(1)(*d*). These processing modules cooperate with each other to process safety information consistent with the functions of driving safety information system 300 of FIG. 3.

In an illustrative operation, safety information processing computing application 180*b* accepts raw data indicative of driver and/or vehicle events. An event can generally be considered as an accident, incident, or other occurrence related to a driver and/or vehicle. This raw data maintains disparate formats and is not homogenous. To standardize this data, data standardization processing module 180*b*(1)(*a*) is employed to create standardized data from the raw data. Specifically, raw data can be collected from a number of sources including state department of transportation agencies, municipalities, and other governing agencies. Each of these governing bodies formats driver and/or vehicle data differently using different codes for different actions. That is, a first agency may assign the code "MV" for a moving violation, where a second agency may simply use the code "M" for moving violation. In addition, some agencies may not have codes at all for certain actions. The data standardization processing module 180*b*(1)(*a*) performs standardization of the raw data by assigning a new internal code from a pre-defined list of codes. By doing so, the raw data having thousands of different codes (often having different codes for the same event) is paired down to a more manageable list of codes for use in subsequent processing.

Once the raw data is standardized, safety information processing computing application 180*b* can employ business rules process module 180*b*(1)(*b*) to apply pre-defined business rules to the standardized data. In the implementation provided, these business rules may comprise instructions for assigning risk levels to the standardized data. In addition, the business rules may comprise instructions for tracking the progress of risk levels for drivers and/or vehicles and based upon a change in the risk levels (i.e. resulting from a driver or vehicle event) recommending and offering remediation in the form of safety education (or other response). In addition, the business rules may comprise instructions for tracking the progress of offered remediation. For example, the business rules would determine the points assigned for the various moving violations irrespective of the points assigned by the governing agencies and assign risk levels for various point totals.

The analysis features processing module 180*b*(1)(*c*) of safety information processing computing application 180*b* may be used to perform a variety of analysis during any stage of processing. Such analysis may include, but is not limited to, trend analysis for a driver/vehicle or groups of driver/vehicles. In addition, forecast analysis, statistical analysis, averaging analysis, impact analysis, and so on, is contemplated by analysis features processing module 180*b*(1)(*c*).

Lastly, as shown in FIG. 3B, safety information processing computing application 180*b* may comprise reporting features processing module 180*b*(1)(*d*). Reporting features processing module 180*b*(1)(*d*) may be employed to cooperate with other processing modules to generate reports for display and storage of representative information about driver/vehicle safety behavior. The driver/vehicle safety information may be communicated by reporting features processing module 180*b*(1)(*d*) through a variety of means to effectively leverage and distribute to administrators and drivers alike. In the implementation contemplated, reporting features processing module employs the Internet as a communications network to deliver the driver/vehicle safety information.

FIG. 4 shows the processing and data flow for driving safety information system 300 of FIG. 3. As shown, processing begins at block 400 where event data is collected.

Event data may comprise driver/vehicle accident, incident raw data, or data relating to remediation progress (e.g. test scores on driver safety tests, completion of a behind-the-wheel driving course, etc.). Event data may be compiled from a variety of sources including but not limited to state department of transportation agencies, municipalities, third party vendors of driver accident/incident information, or other equivalent sources. In addition, event data may comprise user (e.g. administrator) defined data generated by the system that the user wishes to use to impact overall system processing. As such, event data may comprise a number of different formats having various meanings. Event data 400 acts as input to standardize processing block 410. Standardize processing block 410 accepts event data 400 in its many forms and formats and standardizes it using a list of pre-defined codes so that the data is homogenous and more easily processed. Once standardized, the standardized data acts as input to grade or sort processing block 420. Grade or sort processing block 420 classifies the standardized event data to different categories. For example, it may determine from the event data which drivers/vehicles have outstanding remediation. Alternatively, grade or sort processing block 420 may identify which data needs to be communicated and to whom to communicate the data. The sorting process is based on predefined criteria that may include an overdue measure (e.g. a driver has not performed required remediation with the prescribed time), an expired measure (e.g. a driver has not renewed his or her license before a critical date), malfeasance (e.g. a driver has continued to drive when driving privileges have been revoked), and misfeasance (e.g. required remediation is not completed in its entirety). Once sorted, the sorted event data is passed to rules engine 430. At rules engine 430, the sorted event data is processed with a number of instructions to assign risk levels to the standardized sorted event data and to determine if any critical events have taken place. A critical event is a user (e.g. administrator) defined parameter that when performed necessitates a response (e.g. remediation). A critical event can comprise any number of different occurrences including but not limited to a severe accident, a severe traffic violation, or the passage of time. These risk levels are assigned according to a user-defined list of rules at rules engine 430. Depending on the event data, driving safety information system 300 can proceed to monitor processing block 440 or alternatively to remedy processing block 450. The nature of the event data (e.g. if the event being processed is a critical event) will determine the processing path. Generally at the monitor processing block 440, event data is attached to the driver/vehicle record for storage for future processing. Comparatively, if processing proceeds to remedy processing block 450, the event data is further processed such that appropriate remediation (e.g. driving safety education) may be suggested and offered. Also, remedy processing block 450 tracks the progress of offered remediation. Resulting from remedy processing block 450 is generally an event 460. Event 460 may comprise completed remediation and a driver/vehicle's response to such remediation (e.g. driver's test scores). As shown, the remediation event 460 is fed back into driving safety information system 300 at block 400 for processing so as to modify the risk level associated with a particular driver/vehicle.

The processing and data flow for driving safety information system 300 of the present invention is further described by the following example. As stated, driving safety information system 300 may be employed to offer a driver and/or vehicle centric approach to improve driver safety. Generally, driving safety information system 300 provides administrators of driving fleets (e.g. a sales force manager) and drivers with a comprehensive system to monitor drivers and/or vehicles such that appropriate remediation can be delivered to drivers upon the occurrence of a event (e.g. an accident and/or incident). The system is automated such that administrators are offered reports for monitored drivers/vehicles and drivers and vehicle operators are offered information about their driving behavior and/or vehicle status. This is generally accomplished by maintaining a data store of driver and/or vehicle records.

As mentioned, driving safety information system 300 contemplates the use of pre-determined risk levels that are assigned to and stored for each driver/vehicle representative of driving behavior and/or vehicle operation. These risk levels are recalculated and updated upon the occurrence of an event (e.g. accident, incident, or remediation) by the driver/vehicle. Upon the occurrence of an event, and depending on the severity of the event, driving safety information system 300 electronically offers, tracks, and distributes remediation (e.g. driving safety education) to the driver and/or the vehicle owner. As part of the processing, the driver/vehicle records are updated with remediation information. In addition, these records are analyzed by driving safety information system 300 to produce reports for display to administrators.

For example, an administrator (e.g. a sales force manager) may employ driving safety information system 300 to automate the process of managing a fleet of drivers (e.g. sales people). Driving safety information system 300 offers two interface areas (as described in FIGS. 5–5B and 6–6B, respectively) through exemplary computing application 180*a* allowing access for participating drivers and administrators. In operation, an administrator, through the administrator interface areas, can input data representative of driver and/or vehicle profiles. Drivers and/or vehicles that have records in driving safety information system 300 may be considered monitored drivers/vehicles. The driver/vehicle information is stored by driving safety information system 300 and is used when processing event data. Once the driver/vehicle record is created, access also may be granted to the driver/vehicle to driving safety information system 300 through the driver interface area. In operation, driving safety information system 300 process event data (as defined by FIG. 4) so as to assign and update driver/vehicle information for monitored drivers/vehicles. Based on the event or events that transpire, driving safety information system 300 recommends, offers, distributes, tracks, reports, and manages remediation for drivers and vehicles. In addition, driving safety information system 300 is capable of analyzing event data with driver/vehicle profile information to generate reports for distribution to administrators through the driver interface area of exemplary computing application 180*a*.

In an exemplary illustration, an administrator may monitor a fleet of drivers. One of the monitored drivers may engage in a traffic violation (e.g. running a red light). The traffic violation information (received from department of transportation, a designated reporting agency, or third party vendor of driver/vehicle event data) acts as input to driving safety information system 300 as event data. The event data is processed to retrieve information used in subsequent processing, such as, the nature of the event and the driver/vehicle information. Using this information, the driver/vehicle record is retrieved and processed with the event data according to pre-defined business rules. Applying the rules, the driver/vehicle record is updated and/or modified and is prepared for storage. Depending on the event and the business rules applied, driving safety information system 300 may offer, distribute, track, and administer remediation to the offending driver/vehicle (in this example remediation may comprise distributing one or more articles on traffic safety and administering a test to the driver to gauge response to the offered remediation) through the driver interface area. If remediation is offered, information relating to the remediation and the response to the remediation is added to the driver/vehicle profile for storage. When performing analysis, driving safety information system 300 processes the driver profile information to generate reports for distribution to participating administrators through the driver interface area. Driving safety information system 300 is also adaptable so as to communicate such information through other communication means including but not limited to e-mail, pager notification, instant messaging, short message services, or other equivalent and available electronic communication means. In this example, the administrator for the offending driver would be able to observe various information resulting from the traffic violation, including, the nature of the event (i.e. that the offending driver ran a red light), the impact of the event on the driver's profile (e.g. if the driver's risk level has changed), and the type and progress of offered remediation (e.g. what remediation the offending driver engaged and his/her progress on the remediation). In addition, driving safety information system 300 is capable of generating reports having a variety of information for all of the monitored drivers that are monitored by the participating administrator. These inclusive reports may comprise trend information, average information, statistical information, and forecast information for monitored drivers.

Although the above example describes the present invention having a driver centric-approach, the inventive concepts contemplated by the present invention also accommodate a vehicle-centric approach such that vehicles and not drivers are monitored and managed by driving safety information system 300. For example, instead of monitoring driver events, safety information processing system 300 monitors vehicle events such as accidents, maintenance needs, and maintenance performed to assign a quantitative descriptor according to some pre-defined criteria (e.g. a vehicle that has a transmission replaced may have a quantitative descriptor of 2, where a vehicle that has an engine overhaul may have a quantitative descriptor of 4) to vehicles. Using this quantitative descriptor, administrators and vehicle operators are better positioned to assess the operation strength of a particular vehicle.

FIGS. 5–5B show screen shots of exemplary computing application 180*a* illustrating an administrator interface to driving safety information system 300. As shown, administrator interface 500 comprises display pane 505 having a display area and controls for the displaying and controlling content 503, 510, and 515. Content 503, 510, and 515 may comprise various types of content. In the example provided, content 503 comprises a "login" dialog interface box that acts as security measure for driving safety information system 300 to ensure that only authorized personnel (e.g. registered administrators) have access to administrator-type content (e.g. edit rights to driver/vehicle profile information, reports about drivers/vehicles, edit rights to safety policies, etc.). Comparatively, content 510 comprises driver/vehicle administrator-type content. Lastly, content 515 comprises control features that allow participating administrators the ability to view and interact with various type of administrator-type content. As shown content 515 may offer various exemplary controls to allow participating administrators the ability to perform administration of drivers/vehicles (e.g. form a fleet, display safety awards, display generated reports, search drivers, design and display remediation, edit driver/vehicle profiles, and modify business rules—i.e. critical events).

FIGS. 6–6B show screen shots of exemplary computing application 180*b* illustrating a driver interface to driving safety information system 300. As shown, driver interface 600 comprises display pane 605 having a display area and controls for the displaying and controlling content 603, 610, and 615. Content 603, 610, and 615 may comprise various types of content. In the example provided, content 603 comprises a "login" dialog interface box that acts as security measure for driving safety information system 300 to ensure that only authorized personnel (e.g. registered drivers) have access to driver-type content (e.g. logged-in driver/vehicle profile information, remediation information for logged-in drivers/vehicles, etc.). Comparatively, content 610 comprises driver/vehicle driver-type content. Included in content 610 may be remediation that is administered to drivers. Lastly, content 615 comprises control features that allow participating drivers the ability to view and interact with various type of administrator-type content. As shown, content 615 may offer various exemplary controls to allow participating drivers to manage their profiles (e.g. view safety awards, display and update profile information, display and interact with remediation measures, and a means to contact administrators).

In the contemplated illustrative implementation, the functions and operations of computing applications 180*a* and 180*b* of driving safety information driving safety information system 300 may be realized through the execution of various function calls performing specific processes. FIGS. 7–7T show processing flow diagrams for various function calls performed by driver/vehicle safety driving safety information system 300 of FIG. 3 and FIG. 4. Elements 700–799*a* of FIGS. 7–7T show the various components that contribute to the execution of these functions.

Specifically, FIG. 7 shows the processing performed when executing a function to perform a lookup on remediation related tables that are supported by the computing applications. This function is called from blocks 700 and 701 to receive data. A lookup is performed on the reading assignment table 702, the test assignment table, and any other training or education table(s) to realize execution. If it is determined in steps 703 and 704 that the reading assignment is performed within the required time frame (or not), this information is communicated back for storage in the driver's data file.

FIG. 7A shows the processing performed when executing a function that offers, tracks, distributes, and manages remediation measures to participating drivers/vehicles. The function is called from blocks 700 and 705 where a lookup of the driver profile is performed using users table 706. A lookup is also performed for required remediation based on the event code using required reading table 707. This function also verifies that the same remediation measures have not been offered prior by performing a query at step 709 on the offered remediation table 710 and search description table 711. Using tables 710 and 711 appropriate remediation is then offered.

FIG. 7B shows the processing performed when executing a function that communicates (e.g. via e-mail) a change in a driver/vehicle's risk level. The function is called from blocks 700 and 712 where a lookup is performed of the driver profile using users table 706.

FIG. 7C shows the processing performed when executing a function that communicates to participating users when required remediation has expired. The function is called from blocks 700 and 715 where a lookup is performed on users table 716 to generate communication 717 for communication via communication network 160.

FIG. 7D shows the processing performed to determine whether remedial reading assignments have been performed by the designated driver. As shown, processing begins at caller template block 700 interacting with E-mailReadAssign custom tag 718. Custom tag 718 cooperates with the read assign table 702 and users table 716 to generate e-mail messages at block 717. In addition, environment variables table 703 is employed to generate the e-mail messages contemplated by block 717. Once the e-mail message is generated, it is communicated via communications network 160.

FIG. 7E shows the processing performed when executing other functions that communicate a change in risk level. The function is called from blocks 700 and 718 to proceed to perform a profile lookup using users table 716 such to generate a communication 717 for communication via communications network 160.

FIG. 7F shows the processing performed when executing a function to determine a driver/vehicle's most recent event. The function is called from blocks 700 and 720 to proceed to perform lookups on the driver's profile, the loss table 721, and violation events table 724 to create and sort loss events 722 and violation events 723. Using filter 725 this function picks the last event from the sorted list and returns the event to the caller at blocks 700 and 720.

FIG. 7G shows the processing performed when executing a function that sends a communication relaying remediation progress for a particular driver and/or vehicle (e.g. to execute an e-mail threshold action). The function is called from blocks 700 and 720 to proceed to perform a profile lookup on users table 716 and using environment variables 703 generates a communication 717 for communication via communications network 160.

FIG. 7H shows the processing performed when executing a function that performs searches of drivers based on keywords. The function is called from blocks 700 and 736 to proceed to perform a search using decision block 727 and users table 706 for drivers/vehicles based on inputted keywords.

FIG. 7I shows the processing performed when executing a function that determines drivers/vehicles that had changes in risk level during the current week (e.g. to execute a function to get weekly stats for a monitored driver and/or vehicle fleet). The function is called from blocks 700 and 720 and proceeds using blocks 727–734 to perform a lookup of all processed actions that pertain to risk level changes. The changes are filtered through a date algorithm to determine which events pertain to the current week. The list is further processed through additional filters to determine which events pertain to a particular risk level.

FIG. 7J shows the processing performed when executing a function that records the test score for remediation and communicates the test score to a list of recipients and/or organizational hierarchy (e.g. to execute a function to record drivers' test score obtained on required remediation tests). The function is called from blocks 700 and 720 to proceed to process the test scores using blocks 716, and 735–738.

FIG. 7K shows the processing performed when executing a function that determines the critical events, categories, and drivers creating critical events during the current month (e.g. to execute a function to get monthly critical event statistics). The function is called from blocks 700 and 720 where a lookup of all processed actions and critical events is performed by blocks 727, and 739–746.

FIG. 7L shows the processing performed when executing a function that scans the events looking for critical events (e.g. to execute a function to check threshold events). The function is called from blocks 700 and 720 and employs blocks 706, 743, 744, 748, 749, 750, 752, and 753 to perform the required lookup.

FIG. 7M shows the processing performed when executing a function that communicates when a driver has engaged in a critical event. As shown, processing begins with caller template 700 interacting with E-mailThresholdAction custom tag 754. Custom tag 754 cooperates with users table 716 and environment variables 703 to generate e-mail message at block 717 for communication over communications network 160.

FIG. 7N shows the processing performed when executing a function that determines critical events, categories, and drivers creating those events in the current week. Using blocks 700, 720, 727, 744, 743, 755, 746, 756, 740, 742, and 757, these critical event statistics are gathered for the current week and returned to the caller. As shown, processing begins at block 700 where caller template interacts with custom tag 720. From the custom tag block 720, information is gathered from loss descriptions table 744, previous actions table 727, and violation descriptions table 743 for possible driver/vehicle events. A check is performed at block 756 to determine if the loss descriptions and violation description information qualify as a critical event. An event code list is parsed at block 746 to assign an a code for the identified critical event. A check is then performed at block 755 to determine if the event had been processed. If it has not, a second event code list is parsed for relevant event codes at block 740. The codes are also assigned to the identified events at block 740. A check is then performed at block 757 to determine if the identified events have occurred during a particular week. If they have they are reported to the custom tag at block 742.

FIG. 7O shows the processing performed for an administrator navigating in the administrator interface portion of computing application 180a. As shown, blocks 758–771 are employed to realize this interface portion. As shown, an administrator logs in at block 758. The login information is checked for authorization at block 759. If incorrect login information is provided an authorization failure occurs at block 760. If authorization is granted, processing proceeds to block 761 to determine available rights the logged in administrator is to receive. If there are no rights, caller template 762 is called to establish rights for the logged in administrator. However, if there are rights, the administrator is navigated to the administrator's home at block 763. Associated with the administrator's home is an administrator profile that is retrieved from administrator profile table 765. In addition, a log is generated and stored at block 764 that contains information about the administrator's activities. From the administrator's home, the administrator performs various operations by calling custom tags 766 and using administrator menus 771. A check is performed periodically at block 767 to ensure that the administrator has not logged out and logs out the administrator at block 768 if the administrator does not perform any operations within a given period of time. Further a check is performed at block 769 using rights information block 770 to determine if the participating user has sufficient rights to access the requested information.

FIG. 7P shows the processing performed for a driver/vehicle navigating in the driver/vehicle interface portion of computing application 180a. As shown, blocks 772–787 are employed to realize this interface portion. As shown, a participating driver is allowed to log in at block 772. A check is then performed at block 773 to determine if the log in information is correct (i.e. if the driver is authorized to use computing application 180a). If 30 not authorized, an authorization failure occurs at block 774. If, however, the driver is authorized, the driver is navigated to the driver home at block 775. Associated with the driver home is the driver profile retrieved from profile table 777 and a driver activity log 776 that stores driver activity in the driver/vehicle interface portion of computing application 180a. From the driver home, the driver is allowed to perform various operations by using control features 780–787. Examples of such operations include, but are not limited to, viewing safety award information by calling awards feature 787, viewing profile information by calling information feature 786, and so on. In addition a check is performed at block 778 to ensure that the driver is still logged in. If there is not activity for a pre-determined period of time, the driver is logged out at block 779.

FIG. 7Q and 7S show processing performed to execute functions that determine users that have completed the required remediation (e.g. reading and testing) during the current week and current month, respectively. As shown, blocks 700, and 788–793 are employed to realize this operation.

FIG. 7R shows the processing performed to execute a function that determines who has completed assigned remediation progress measures (e.g. tests) during the current week. As shown, blocks 700, 720, 790–799 and 799a are employed to realize this operation.

FIG. 7T shows the processing performed to execute a function that determines drivers' and/or vehicles' current risk levels and total safety points aggregated over a predetermined period of time (e.g. the safety point total for the last 12, 24, and 36 month periods). In addition this function is capable of calculating cumulative safety point totals, average safety point totals, and fleets' average point total. As shown in, FIG. 7T processing is initiated by caller template calling CalcDriverRiskLevel custom tag 720. In operation, custom tag 720 cooperates with loss table 721, loss description table 743, event table 724, and event description table 744 to date sort events through date filter 710a. These events are then assigned risk levels from risk levels table 702a. The risk levels are then sorted by best/worst sort 704a to provide a list of events and risk levels according to date in some predefined order (e.g. ascending order, average, etc.). The risk assigned event list data is returned to CalcDriverRiskLevel custom tag 720 for delivery to caller template 700. In addition, as shown, CalcDriverRiskLevel custom tag 720 is also capable of storing the risk assigned event data lists in appropriate driver and/or vehicle profiles stored in users table 716. Further, custom tag 720 cooperates with other functions to execute run risk level actions 708a as realized by run check 706a.

Although a number of functions have been described, it is appreciated that the present invention is not limited to exclusively executing these functions alone, but rather contemplates the execution of various functions and operations to realize the inventive concepts described herein.

In sum, the present invention provides systems and methods for collecting, processing, and distributing information to promote safe driving. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer systems. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be implemented as a computer-readable storage medium, configured with a computer program, where the storage medium so configured causes a computer to operate in a specific and predefined manner.

Further, the storage elements of the exemplary computing applications may be relational or sequential (flat file) type computing databases that are capable of storing data in various combinations and configurations.

Although exemplary embodiments of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention construed in breadth and scope in accordance with the appended claims.

What is claimed is:

1. A system to promote safer driving comprising:
    a data store that stores raw and formatted event data representative of at least one of driver events and vehicle events;
    a business rules engine that applies predetermined business rules to said driver/vehicle event data, said business rules comprising instructions to process said driver/vehicle event data in accordance with predetermined safety paradigms to produce processed driver/vehicle safety data; and
    a remediation and monitoring system that cooperates with said business rules engine to process said processed driver/vehicle safety data to determine remediation measures to offer to respective drivers and to monitor compliance by said drivers with the offered remediation measures.

2. The system as recited in claim 1, wherein said driver and vehicle events comprise at least one of an accident, a traffic violation, and remediation completion by drivers.

3. The system as recited in claim 1, wherein said data store includes driver/vehicle profiles having information about drivers/vehicles that are to be monitored by said system.

4. The system as recited in claim 1, further comprising a data standardization module that processes disparate raw and formatted driver and/or vehicle event data stored in said data store to homogenize said raw and formatted driver and/or vehicle event data to at least one pre-defined format.

5. The system as recited as recited in claim 4, further comprising a sorting module that separates formatted driver/vehicle event data based on pre-defined criteria.

6. The system as recited in claim 5, wherein said sorting module sorts formatted driver/vehicle event data into categories including at least one of an overdue measure, an expired measure, a malfeasance, and a misfeasance.

7. The system as recited in claim 6, wherein said remediation and monitoring system further communicates reporting information about said sorted driver/vehicle events to a pre-defined list of recipients and/or an organizational hierarchy.

8. The system as recited in claim 7, wherein said reporting information is electronically communicated through a communications network comprising at least one of a fixed-wire LAN, a wireless LAN, a fixed-wire WAN, a wireless WAN, a fixed-wire intranet, a wireless intranet, a fixed-wire extranet, a wireless extranet, cellular telephony, wireless paging, the Internet, and the wireless Internet.

9. The system as recited in claim 1, wherein said business rules engine assigns risk values to and identifies critical events for said driver/vehicle events, said risk values representative of the degree of required remediation in accordance with said predetermined driving safety paradigms.

10. The system as recited in claim 1, wherein said remediation and monitoring system further processes said processed driver/vehicle safety data to ascertain if remediation and/or monitoring is to be offered in accordance with said predetermined safety paradigms.

11. The system as recited in claim 10, wherein said remediation and monitoring system electronically distributes, tracks, and manages remediation measures to drivers using a communications network, said communications network comprising at least one of a fixed-wire LAN, a wireless LAN, a fixed-wire WAN, a wireless WAN, a fixed-wire intranet, a wireless intranet, a fixed-wire extranet, a wireless extranet, cellular telephony, wireless paging, the Internet, and the wireless Internet.

12. The system as recited in claim 3, wherein said remediation and monitoring system electronically updates said driver/vehicle profiles to include new driver/vehicle events processed by said business rule engine.

13. The system as recited in claim 12, wherein said remediation and monitoring system electronically communicates updates to participating users using a communications network comprising any of a fixed-wire LAN, a wireless LAN, a fixed-wire WAN, a wireless WAN, a fixed-wire intranet, a wireless intranet, a fixed-wire extranet, a wireless extranet, cellular telephony, wireless paging, the Internet, and the wireless Internet.

14. The system as recited in claim 13, wherein said participating users comprise at least one of administrator of driver fleets, drivers in a fleet, administrators of vehicle fleets, and vehicle operators.

15. The system as recited in claim 4, further comprising a reporting module capable of processing said driver/vehicle event data and correlating said driver/vehicle event data to stored driver/vehicle profiles to generate reports including at least one of trend analysis, statistical analysis, forecasting analysis, averaging analysis, and performance analysis.

16. The system as recited in claim 15, wherein said reporting module electronically communicates said reports to participating users using a communications network comprising any of a fixed-wire LAN, a wireless LAN, a fixed-wire WAN, a wireless WAN, a fixed-wire intranet, a wireless intranet, a fixed-wire extranet, a wireless extranet, cellular telephony, wireless paging, the Internet, and the wireless Internet.

17. The system of claim 1, wherein said remediation measures comprise driver safety education materials and tests.

18. A method to monitor drivers events in an effort to promote safer driving amongst a group of drivers, comprising the steps of:

receiving driver/vehicle event data identifying at least one of a driver/vehicle accident and traffic infraction for respective drivers in said group of drivers;

processing said driver/vehicle event data according to pre-defined instructions to assign a risk level and critical events to said respective drivers for storage in driver profiles for said respective drivers;

offering targeted remediation measures to drivers having at least a pre-determined risk level and/or critical event; and monitoring compliance with said targeted remediation measures by said drivers having at least said predetermined risk level and/or critical event.

19. The method as recited in claim 18, comprising further the step of standardizing said driver/vehicle event data to at least one predefined format.

20. The method as recited in claim 18, wherein said processing step comprises the steps of assigning points to said driver/vehicle accident and traffic infractions and setting said risk levels at predetermined point levels for said respective drivers.

21. The method as recited in claim 18, further comprising the step of providing said first and second set of pre-determined risk-levels and/or critical events to participating users.

22. The method as recited in claim 18, wherein said targeted remediation measures are determined based on the driver/vehicle accident and traffic infraction data collected for a particular driver.

23. The method as recited in claim 18, comprising the further step of generating reports about said driver profiles for electronic communication to at least one of an administrator of said group of drivers, respective drivers in said group of drivers, and an administrator of a vehicle fleet driven by said group of drivers using a communications network comprising any of a fixed-wire LAN, a wireless LAN, a fixed-wire WAN, a wireless WAN, a fixed-wire intranet, a wireless intranet, a fixed-wire extranet, a wireless extranet; cellular telephony, wireless paging, the Internet, and the wireless Internet.

24. The method of claim 18, wherein said targeted remediation measures comprise driver safety education materials and tests.

25. A method to electronically monitor drivers in an effort to promote safer driving, comprising the steps of:

accepting electronic driver event data comprising at least one of accident data, incident data, and remediation data;

processing said driver event data in accordance with a pre-defined list of rules to assign a risk level to each driver for storage in a driver profile for each driver, assign critical events to each driver for storage in a driver profile for each driver, and to determine if remediation measures are required for each driver based on the assigned risk level;

electronically providing, tracking, administering, and managing remediation measures to those drivers having a predetermined risk level and/or having been assigned a critical event, wherein different remediation measures are offered for different risk levels and/or different critical events, said different remediation measures comprising varying degrees of driving safety information and driving safety information tests; and reporting data representative of at least one of driver profiles, remediation progress, driver events, and risk levels to at least one of a driver having a driver profile and an administrator that monitors the driving of a plurality of drivers having driving profiles.

26. A computer readable storage medium having computer readable instructions stored thereon for instructing a computing device to perform the steps recited in claim 25.

27. The method of claim 25, wherein said remediation measures comprise driver safety education materials and tests.

28. A system to monitor drivers in an effort to promote safer driving, comprising:

a computing application comprising a user interface having an administrator interface and a driver interface, said administrator interface having display regions and controls to control administrator-type content, and said driver interface having display regions and controls to control driver-type content, wherein said administrator interface is operable by an administrator to create driver profiles, to view reports generated by said computing application representative of driver profiles for respective drivers and to establish driving safety paradigms for execution by said computing application, said driving safety paradigms being realized through the application of business rules on driver events to assign risk levels and/or identify and assign critical events for storage in said driver profiles and said business rules further providing instructions and guidelines for offering remediation measures to said drivers based on the risk levels assigned to said drivers, and wherein said driver interface is operable by participating drivers to view said driver profile and to engage in said remediation measures; and wherein a communications network cooperates with said computing application to communicate data between said drivers and said computing application.

29. The system as recited in claim 28, wherein said remediation measures comprise driving education materials and tests.

30. The system as recited in claim 28, wherein said communications network comprises any of a fixed-wire LAN, a wireless LAN, a fixed-wire WAN, a wireless WAN, a fixed-wire intranet, a wireless intranet, a fixed-wire extranet, a wireless extranet, cellular telephony, wireless paging, the Internet, and the wireless Internet.

31. A method to promote safer driving, comprising the steps of:

providing an automated driving safety information processing system to administrators of driver fleets, said automated driving safety information processing system capable of accepting driver event data and processing said driver event data to assign risk levels and/or critical events for monitored drivers for storage in driver profiles, said automated driving safety information processing system automatically and electronically distributing, tracking and managing remediation measures to drivers having a pre-defined risk level and/or critical events and reporting at least said driver profiles to said administrators; and executing said automated driving safety information processing system in response to queries from at least one of monitored drivers and from said administrators.

32. The method of claim 31, wherein said remediation measures comprise driver safety education materials and tests.

* * * * *